United States Patent
Jagannathan

(10) Patent No.: US 11,868,226 B2
(45) Date of Patent: Jan. 9, 2024

(54) LOAD TEST FRAMEWORK

(71) Applicant: AVEVA Software, LLC, Lake Forest, CA (US)

(72) Inventor: Madhav Jagannathan, Irvine, CA (US)

(73) Assignee: AVEVA Software, LLC, Lake Forest, CA (US)

( * ) Notice: Subject to any disclaimer, the term of this patent is extended or adjusted under 35 U.S.C. 154(b) by 0 days.

(21) Appl. No.: 17/307,610

(22) Filed: May 4, 2021

(65) Prior Publication Data
US 2021/0365347 A1 Nov. 25, 2021

Related U.S. Application Data

(63) Continuation of application No. 15/842,969, filed on Dec. 15, 2017, now Pat. No. 11,023,349.

(51) Int. Cl.
*G06F 11/34* (2006.01)
*G06F 11/30* (2006.01)

(52) U.S. Cl.
CPC ...... *G06F 11/3414* (2013.01); *G06F 11/3452* (2013.01); *G06F 11/3013* (2013.01)

(58) Field of Classification Search
CPC ............ G06F 11/3414; G06F 11/3452; G06F 11/3013
See application file for complete search history.

(56) References Cited

U.S. PATENT DOCUMENTS

| | | | |
|---|---|---|---|
| 6,609,216 B1 * | 8/2003 | Almy | G06F 11/3419 717/130 |
| 7,093,249 B2 | 8/2006 | Melamed et al. | |
| 7,437,614 B2 * | 10/2008 | Haswell | G06F 11/3684 714/E11.208 |
| 8,667,017 B1 | 3/2014 | Forney et al. | |
| 8,850,407 B2 * | 9/2014 | Hemed | G06F 11/3684 717/131 |
| 9,632,917 B2 * | 4/2017 | Cai | G06F 11/3684 |
| 10,417,314 B2 * | 9/2019 | Petti | G06F 8/40 |
| 2002/0124042 A1 * | 9/2002 | Melamed | G01M 15/00 702/123 |

(Continued)

FOREIGN PATENT DOCUMENTS

WO 2016109277 A1 7/2016

OTHER PUBLICATIONS

International Search Report and Written Opinion for International Application No. PCT/US18/65597 dated Feb. 26, 2019, 10 pages.

*Primary Examiner* — Daxin Wu
(74) *Attorney, Agent, or Firm* — Greenberg Traurig, LLP

(57) ABSTRACT

A computer-implemented method and system involve providing a script-driven framework to monitor performance of operations on two or more sets of objects to be executed on a target system in parallel on separate threads according to a test scenario with user-defined language stipulations from a script file, and executing the script file through the framework to implement the test scenario on the target system. The language stipulations include an operation hierarchy for each of the two or more sets of objects and at least one synchronization point corresponding to a point in time at which operations on the separate threads are to be synchronized. The framework can be XML-compliant.

17 Claims, 35 Drawing Sheets

(56) References Cited

U.S. PATENT DOCUMENTS

| | | | |
|---|---|---|---|
| 2005/0114839 A1* | 5/2005 | Blumenthal | G06F 11/3672 717/124 |
| 2005/0229176 A1 | 10/2005 | Findeisen | |
| 2006/0129891 A1* | 6/2006 | Padisetty | G06F 11/3688 714/38.14 |
| 2010/0100250 A1 | 4/2010 | Budhraja et al. | |
| 2011/0321012 A1 | 12/2011 | Samantaray et al. | |
| 2012/0017128 A1* | 1/2012 | Tepus | G06F 11/3688 714/724 |
| 2012/0066378 A1* | 3/2012 | Lui | G06F 11/3636 709/224 |
| 2013/0290934 A1 | 10/2013 | Simon | |
| 2014/0343886 A1* | 11/2014 | Berinato | G05B 23/0256 702/123 |
| 2017/0147480 A1* | 5/2017 | Lachwani | G06F 11/3664 |
| 2019/0095311 A1* | 3/2019 | Milirud | G06F 11/3466 |

* cited by examiner

TABLE A

| On_Error | Effect |
|---|---|
| stop | The thread terminates, and awaits reaping by the main thread. Other threads of execution continue through to completion, in order to reduce the manual cleanup that will inevitably be warranted. |
| skip | Directive d3 is aborted, and d4, and its descendants, are *skipped*. The loop proceeds with its next iteration. Directive d3 records a successful outcome. |
| continue | Directive d3 is aborted, and all directives starting with that which follows it (d4, and its descendants, in this case) are processed. Directive d3 records a successful outcome. |

Fig. 7

TABLE B

| Directive | Attribute 1 | Attribute 2 | Attribute 3 | Description |
|---|---|---|---|---|
| create_template | name | template | | Creates a template object |
| create_instance | name | template | host | Creates an instance object, and optionally assigns it to the object referenced by the *host* attribute. |
| rename_object | name | to | | Renames object from name->to. Care should be taken to qualify 'name' and 'to' with '$' if 'name' represents a template. |
| manage_object | name | | | Performs checking-out and checking-in once on behalf of all nested assign_object, add_uia, add_primitive, and attribute directives it contains. |
| assign_object | name | to=host:object<br>to=container | undo_to=""<br>undo_to=host | Assigns an object to another (containment). Performs unassignment if to = "". *name* may be omitted if this directive is a child of a manage_object directive. To assign object to area, engine, or platform, qualify the value of *to* with the type of hosting being established, as in: to="area:AreaObject". undo_to defaults to "", but may be set to a hosting object. When the assign_object directive is rolled back, the named object will be assigned to the [hosting] object identified by the value of undo_to. Since undo_to defaults to "", rolling back this directive has the effect of unassigning the named object. |

Fig. 8

TABLE B
(Continued)

| Directive | Attribute 1 | Attribute 2 | Attribute 3 | Description |
|---|---|---|---|---|
| add_uda | name | uda_name | Type category classification | Adds a UDA of the specified *type*, *category*, and *security classification* to an object. *name* may be omitted if this directive is a child of a *manage_object* directive. |
| add_primitive | name | uda_name | primitive_type | Creates an extension primitive of type *primitive_type* for a named UDA in a named object. *name* may be omitted if this directive is a descendant of a *manage_object* directive. *uda_name* may be omitted if this directive is a child of the *add_uda* directive. |
| attribute | name | attr_name | attr_value lock=[true\|false] | Sets the value of an attribute identified by *attr_name*, belonging to an object identified by *name*, to *attr_value*. Additionally, the attribute is locked if *lock* is set to "true". *name* may be omitted if this directive is a descendant of a *manage_object* directive. |
| *Control flow* | | | | *Described below* |

Fig. 9

TABLE C

| Directive | Attribute 1 | Attribute 2 | Description |
|---|---|---|---|
| block | Condition [="true"] | | Executes a block of child directives if condition evaluates to "true". Condition defaults to "true". |
| auto_block | Condition [="true"] | support_undo [="false"] | Executes and undoes a block of child directives if condition evaluates to "true". Condition defaults to "true". The block cannot be undone unless support_undo is set to "true". Condition defaults to "true", and support_undo defaults to "false". |
| ublock | ref | | Creates an undo block for a block identified by (labeled as) the value of the attribute ref. Both the ublock element and the block element it references must be defined at the same level in the instruction set (i.e., they must be peer directives, although they do not need to be contiguous), and the ublock element must follow the block directive it references. |
| loop | count | Skip_by | Executes a block of child directives up to count times, optionally skipping by the value stipulated in skip_by. Indexing beings at 1, and ends at count. |
| sleep | time | support_undo [="false"] | Causes the active thread to sleep for time milliseconds. The sleep directive is ignored when it appears in a rollback operation unless support_undo is set to "true". |

Fig. 10

TABLE D

| Attribute | Description |
|---|---|
| mode | Accepts values of "serial" or "parallel", and determines whether the threads are executed serially, or in parallel. |
| iterations | A positive integer that determines the number of times that the directives outlined in the run section are to be executed. An implicit point of synchronization awaits the completion of parallel threads of execution before a new iteration is launched. |
| sync_points | Applicable only in "parallel" mode, this integral directive determines the number of synchronization points available for the threads to coordinate their operations with each other. |
| gr_node | GR node name (may be overridden with a command-line parameter). |
| galaxy | Name of galaxy (may be overridden with a command-line parameter). |
| user_id | ID with which to connect to the galaxy (may be overridden with a command-line parameter). |
| password | Galaxy login password (may be overridden with a command-line parameter). |
| trace_file | File in which thread-level activities are traced (may be overridden with a command-line parameter). If trace_file is set to "%temp%\trace.log", and the script is configured to be executed in two threads, two trace files—"%temp%\trace_1.log", and "%temp%\trace_2.log"—are actually created: One for each thread. |

Fig. 11

TABLE E

| Directive | Attribute | Description |
|---|---|---|
| Thread | id | Identifies a block of directives that are executed serially in one thread. The hidden attribute id identifies the thread, and is accessible to its descendants. |
| create_hierarchy | show_performance | This directive creates the hierarchy defined by the setup_hierarchy directive. Setting the show_performance attribute to "true" will result in performance (timing) information to be output for the create_hierarchy operation. |
| delete_hierarchy | show_performance | This directives deletes the hierarchy defined by the setup_hierarchy directive. Setting show_performance to "true" will generate performance information associated with this operation. |
| sync | id | This directive creates a synchronization point in the flow of operations assigned to a thread. A thread that reaches a subscribed synchronization point suspends activities until *all* other threads that subscribe to the same synchronization point reach it, after which it resumes its operations. While a thread directive need not subscribe to all synchronization points, the synchronization points to it does subscribe to must be in the ascending order. And a thread may subscribe to a synchronization point only once. |
| rloop | ref | This is a pseudo control-flow construct that mimics a loop directive in the setup_hierarchy identified by a label with which the ref attribute is qualified. The reference-loop directive inherits the count and skip_by settings of the loop referenced, but these may be overridden (so long as the new count is less than that defined by the referenced loop). More on rloop later. |
|  | count |  |
|  | skip_by |  |

Fig. 12

TABLE E
(Continued)

| Directive | Attribute | Description |
|---|---|---|
| export_hierarchy | file | Exports all instances in the hierarchy defined by a thread to a file (aaPKG) identified by the file attribute of this directive. Note that objects that are not created with the <create_hierarchy> directive are not exported. The specification of a regular expression in the filter clause allows the operation to be confined to instances that match it. The format clause determines whether the file will be exported as a ["PDF"] or a "CSV". |
| | filter | |
| | format | |
| deploy_hierarchy | cascade | Deploys the hierarchy created for the thread executing this directive. Invokes cascade deployment if cascade="true". The specification of a regular expression in the filter clause allows the operation to be confined to instances that match it. The attribute redeploy accepts one of the following values: ["skip"], "changes", or "original". |
| | filter | |
| | redeploy | |
| undeploy_hierarchy | cascade | Undeploys the hierarchy created for the thread executing this directive. Invokes cascade undeployment if cascade="true". The specification of a regular expression in the filter clause allows the operation to be confined to instances that match it. |
| | filter | |
| import_hierarchy | file | Imports objects into the galaxy from the specified aaPKG file. If check_existence is set to "false", the absence of the file will not translate to an initialization error. The import operation concludes by verifying that all instances configured in the setup_hierarchy directive are present. This activity may be curtailed by the specification of a filter. |
| | check_existence | |
| | filter | |

Fig. 13

TABLE F

| Event | Pre handler XML declaration | Post handler XML declaration |
|---|---|---|
| Check-in | pre_checkin | post_checkin |
| Checkout | pre_checkout | post_checkout |
| Undo-checkout | pre_undo_checkout | post_undo_checkout |
| Assign | pre_assign | post_assign |
| Create | pre_create | post_create |
| Delete | pre_delete | post_delete |
| Un-assign | pre_unassign | post_unassign |
| Rename | pre_rename | post_rename |

Fig. 15

Dry Run – Trace
(Example)

```
Evaluating: "*{fuzzy_conditional:#{curr},5,7}" [GRAccessTestFramework.UserDefinedExpression] for CREATENEWINSTANCESLOOP.loop
->Evaluating: "?{*{is_even:#{curr}} OR #{curr} lt 5 AND #{curr} ge 7}" [GRAccessTestFramework.LogicalExpression]
-> ->Evaluating: "*{is_even:#{curr}}" [GRAccessTestFramework.UserDefinedExpression]
-> -> ->Evaluating: "*{mod2:#{curr}} eq 0" [GRAccessTestFramework.ComparativeExpression]
-> -> -> ->Evaluating: "*{mod2:#{curr}}" [GRAccessTestFramework.UserDefinedExpression]
-> -> -> -> ->Evaluating: "#{curr} % 2}" [GRAccessTestFramework.ArithmeticExpression]
-> -> -> -> -> ->Evaluating: "#{curr}" [GRAccessTestFramework.Expression]
-> -> -> -> -> -> ->Result: 1
-> -> -> -> ->Evaluating: "2" [GRAccessTestFramework.Expression]
-> -> -> -> ->Result: 2
-> -> -> ->Result: 1
-> -> -> ->Evaluating: "0" [GRAccessTestFramework.Expression]
-> -> -> ->Result: 0
-> -> ->Result: false
-> ->Evaluating: "#{curr} lt 5 AND #{curr} ge 7" [GRAccessTestFramework.LogicalExpression]
-> -> ->Evaluating: "#{curr} lt 5" [GRAccessTestFramework.ComparativeExpression]
-> -> -> ->Evaluating: "#{curr}" [GRAccessTestFramework.Expression]
-> -> -> ->Result: 1
-> -> -> ->Evaluating: "5" [GRAccessTestFramework.Expression]
-> -> -> ->Result: 5
-> -> ->Result: true
-> -> ->Evaluating: "#{curr} ge 7" [GRAccessTestFramework.ComparativeExpression]
-> -> -> ->Evaluating: "#{curr}" [GRAccessTestFramework.Expression]
-> -> -> ->Result: 1
-> -> -> ->Evaluating: "7" [GRAccessTestFramework.Expression]
-> -> -> ->Result: 7
-> -> ->Result: false
-> ->Result: false
->Result: false
```

Fig. 16

```xml
<GRAccessLoadTest num_threads="2" cwd=".">
  <!-- ======================================= -->
  <!-- -- Set up defaults. -->
  <!-- ======================================= -->
  <defaults Head_Start="2500" CTL_Count="10" CTL_Count="25" ImpExp_file="exparth\Hierachy#{curr}.eaPKG" Show_Performance="false" />
  <!-- ======================================= -->
  <!-- -- Declare complex (and reusable) expressions with this directive. -->
  <!-- ======================================= -->
  <expressions next="| {#{curr} + 1}"/>                   <!-- -- Current loop counter + 1           -->
  <expressions mod2="| {({0} % 2}" is_even=" ? {"{mod2:{0}} eq 0}" />   <!-- -- Is a operand even?  -->
      .        .
      .        .
  <!-- ======================================= -->
  <!-- -- Declare all DLLs that implement functors and event handlers. -->
  <!-- ======================================= -->
  <!-- -- Format: <dll Events="MyEvents.DLL" Util="StringUtils.DLL"/>  -->
  <dll/>
```

FIG. 18

```
<!-- -->
<!-- Set up hierarchy, *{curr} is an accessible local var indicative of hierarchyID. -->
<!-- -->
<Setup_hierarchy Label="HIERARCHY" >
  <Create_instance label="PLATFORM" name="platform_*{curr}" template="$WinPlatform" >
    <Create_instance label="ENGINE" name="@{PLATFORM,name}_Engine" template="$AppEngine" host="platform@{PLATFORM,name}" >
      <Create_instance label="AREA" name="@{ENGINE,name}_Area" template="$Area" host="engine@{ENGINE,name}" >
        <!-- Loop #1: Create derived template hierarchy -->
        ...
        <create_template labels="CTEMP" name="$# {tname}" template= "$UserDefined">
        <!-- Loop #2: Create Instances for each derived template -->
        ...
        </loop>
      </create_template>
      </loop>
    </create_instance>
    </create_instance>
  </create_instance>
</setup_hierarchy>
<!-- End of setup -->
```

FIG. 19

```
<!-- ... -->
<!-- Run performance tests > choose sensible defaults for iterations, code, and tracing. -->
<!-- ... -->
<run iterations="1" code="parallel" sync_points="3" trace_file="trace\thread.log" >
    <!-- ... -->
    <!-- Thread 1 -->
    <Thread Label = "Looper" > ... </Thread>
    <!-- ... -->
    <!-- Thread #2 -->
    <Thread label = "Bulkops" > ... </Thread>
</run>
</GRAccessLoadTest>
```

| Name | Date modified | Type | Size |
|---|---|---|---|
| thread_1.log | Date/Time | Text Document | 49 KB |
| thread_2.log | Date/Time | Text Document | 24 KB |

Fig. 23

| Name | Date modified | Type | Size |
|---|---|---|---|
| OUTPUT001.xml | Date/Time | XML File | 16 KB |

Fig. 24

| Name | Date modified | Type | Size |
|---|---|---|---|
| Hierarchy2.aaPKG | Date/Time | AAPKG File | 15,676 KB |

TABLE G

| Option/Switch | Description | Additional Details |
|---|---|---|
| /d | Invoke script in "dry run" mode. | Specifying the /d switch executes all control flow specified in the script file without performing any GRAccess operations. All logs (trace) and output files are created, allowing you to validate your script. |
| -g galaxy | Specifies name of the galaxy to connect to. | This command-line option overrides the galaxy attribute of the <run> directive. |
| -h help_topic | Displays extended help on the various language elements | -h loop displays useful details about the loop directive. -h without a payload displays all help topics. |
| -i num_iters | The number of times to execute the script. | This command-line option overrides the num_iterations attribute of the <run> directive in the script. |
| -l lib_path | Path to search for DLLs in the <dll> section. | This is similar to %path%, allowing DLLs in the <dll> section of the script to be resolved to their actual locations on disk. |
| -m mode | Thread execution mode: serial or parallel. | This command-line option overrides the mode attribute of the <run> directive in the script. |
| -n node | GR node name | This command-line option overrides the gr_node attribute of the <run> directive. |
| -o output_file | Performance results will be written to output_file. | In the absence of this option, script output will be written to stdout. |
| -p password | Password required to login to the galaxy. | This command-line option overrides the password attribute of the <run> directive. |
| -r set-runtime-property | Enables certain properties that affect runtime behavior. | -r chatty will, for instance, print to console useful milestones in the execution of the script (only if -o is omitted). The option is automatically reset if -o is omitted. |

Fig. 27

TABLE G
(Continued)

| Option/Switch | Description | Additional Details |
|---|---|---|
| -s script_file | Location of the script file. | |
| -t file\|none | Enables thread-level tracing to the specified file. | Tracing is disabled if this option is set to "none". This option overrides the trace_file attribute of the <run> directive. |
| -u userID | ID required to complete galaxy login. | This command-line option overrides the user_id attribute of the <run> directive. |
| -v override-spec | Overrides the value of an attribute of the <defaults> section. | This option may be used more than once. Ex: -v "CTLCount=2" -v "CILCount=5", or "CTLCount=2:CILCount=5" |
| -w working-directory | Overrides the value of the cwd attribute of the root node. | The script execution engine changes to this directory so that all non-absolute output artifacts are produced relative to it. |
| -x Exclusivity-spec | Allows you to select for execution, a subset of threads defined in the script. | -x "only: Looper, ExportImport" selects the threads labeled "Looper" and "ExportImport" for execution. -x "except: BulkOps" selects all threads, with the exception of "BulkOps", for execution. |

```
1     DATE/TIME      LOOPER.THREAD
2     I>LOOPER.THREAD: GO        AT 08:17:03,8318390
3     I  I>SLEEP:GO         AT 08:17:03,8340037
4     I  I>SLEEP:SUCCESS    => 2307.97424812371 NO
5     I  I<CREATE_HIERARCHY: GO        AT 08:17:06,3390311
6     I  I  □ <CREATE_HIERARCHY: SUCCESS   => 18549.8596198298 MS
61    I  I<SYNC: GO        AT 08:17:24,8966866
62    I  I>SYNC: SUCCESS    => 23587.5248111145 MS
63    I  I>SLEEP: GO        AT 08:17:48.4857829
64    I  I   I>MANAGE_OBJECT: GO       AT 08:17:48.4857829
65    I  I   I+CHECKOUT: $UD1_1        [96729.6104407124 MS]
66    I  I   I   I>ADD_UDAT:GO       AT 08:17:48.4857829
67    I  I   I   I+ADD_UDAT: UDA_1_1   => $UD1_1 [2487.36655077671 MS]
68    I  I   I   I<ADD_UDAT: SUCCESS   => 2487.50113492078 MS
69    I  I   I   I>ADD_PRIMITIVE: GO          AC 08:19:28.7016548
70    I  I   I   I+ADD_PRIMITIVE: $UD1_1.UDA_1_1   => HISTROYEXTENSION [373.291986608507 MS]
71    I  I   I   I<ADD_PRIMITIVE: SUCCESS    => 373.413241068348 MS
72    I  I   I   I>ADD_PRIMITIVE: GO          AT 08:19:28.0746963
73    I  I   I   I   I>ATTRIBUTE: GO          AT 08:19:28.4457212
74    I  I   I   I   I+ATTR_NAME | VALU | LOOKS SET_ATTR => $UD1_1 LEVEL A| ARMED | TRUE | TRUE [708.750350318267 MS]
75    I  I   I   I   I<ATTRIBUTE: SUCCESS    => 708.939855103372 MS
76    I  I   I   I   I>ATTRIBUTE: GO          AT 08:19:28.0746963
77    I  I   I   I   I□ <ATTRIBUTE: SUCCESS   => 5897.17219646601 MS
85    I  I   I   I+ADD PRIMITIVE : $UD1_1.UDA_1_1  => ANALOGISECESSION [10096.2734700919 MS]
86    I  I   I   I+ADD PRIMITIVE : SUCCESS    => 10096.3268378266 MS
87    I  I   I+CHECKIN: $UD1_1         [22326.1647880844 MS]
88    I  I   I+MANAGE: $UD1_1 => APPLY    [132008.785134766 MS]
89    I  I   I<MANAGE_OBJECT: SUCCESS   => 132009.300629409 MS
90    I  I   I<RLOOP: GO       AT 08:20:00.5025002
91    I  I   I   I>ASSIGN_OBJCT: GO       AT 08:20:00.5045862
92    I  I   I   I+CHECKOUT: $UD1_1_INST_2   [4121.52033209147 MS]
93    I  I   I   I+CHECKIN: $UD1_1_INST_2    [4121.74012339667MS]
94    I  I   I   I<ASSIGN_OBJCT:UD1_INST_2   => UD1_1_INST_1 [303363.4048715549 MS]
95    I  I   I   I<ASSIGN_OBJCT: SUCCESS   => 30365.8164655005 MS
96    I  I   I   I<ASSIGN_OBJCT: GO       AT 08:20:30.97921979
97    I  I   I   I+CHECKOUT: $UD1_1_INST_4   [5711.30632841967 MS]
98    I  I   I   I+CHECKIN: $UD1_1_INST_4    [2680.8776804792MS]
99    I  I   I   I+ASSIGN_OBJECT: $UD1_1_INST_4  => UD1_1_INST_1 [21154.5218037488 MS]
100   I  I   I   I<ASSIGN_OBJECT: SUCCESS   => 21154.5864767729 MS
101   I  I   I   I>□ <ASSIGN_OBJECT: FELLED: UNKOWN ERROR   => 344.042748449873 MS
105   I  I   I<RLOOP: SUCCESS     =>51866.8883196049 MS
106   I  I<RLOOP: SUCCESS      =>183881.236511903 MS
107   I  I>SYNC: GO        AT 08:20:52.3732204
108   I  I<SYNC: SUCCESS     => 8251.5508116255 MS
109   I  I>RLOOP: GO        AT 08:21:00.7659120
110   I  I   I>RLOOP: GO        AT 08:21:00.7669668
111   I  I   I   I>□ <ASSIGN_OBJECT: SUCCESS   => 52887.4259857049 MS
116   I  I   I   I>□ <ASSIGN_OBJECT: SUCCESS   => 8202.67003205809 MS
121   I  I   I   I>□ <ASSIGN_OBJECT: FAILED: UNKOWN ERROR  => 8202.67003205809 MS
125   I  I   I<RLOOP: SUCESS      => 51399.7420701577 MS
126   I  I<RLOOP: SUCESS       => 61400.5261143525 MS
127   I  I>SYNC: GO        => 68:22:02.1694538
128   I  I<SYNC: SUCCESS     => 2970.74181215769 MS
129   I  I>DELETE_HIERARCHY: GO       AT 08:22:05.1407782
130   I  I   I□ <DELETE_HIERARCHY: SUCCESS  => 18379.9190200215 MS
185   I<LOOPER . THREAD: SUCCESS  => 319680.610664205 MS
186
```

FIG. 30

```
     DATE/TIME    BULKOPS.THREAD
1    >BULKOPS.THREAD: GO          AT 08:17:03.8328301
2    >ABLOCK.AUTO_BLOCK: GO       AT 08:17:03.8368037
3    >CREATE_HIERARCHY: GO        AT 08:17:03.8368051
4    □<CREATE_HIERARCHY: SUCCESS  => 21501.63463512282 MS
5    >EXPORT_HIERARCHY: GO        AT 08:17:25.3447243
60   +EXPORT: C:\USERS\WW\USERDESKTOP\GRAT\FGR ACCESS TESTFRAMEWORK\BIN\DEBUG\EXPORT\HIERARCHY2.AAPKG [6096.14259633557 MS]
61   <EXPORT_HIERARCHY: SUCCESS   => 6178.28746390952 MS
62   +PROCESS [PHASE|TAG: AUTO_BLOCK => TRUE|APPLY|CR|EXPORT 2  [27686.4961189201 MS]
63   >EXPORT_HIERARCHY: UNDO      AT 08:17:31.5242847
64   >EXPORT_HIERARCHY: SUCCESS   => 0.0032825400993701 MS
65   >CREATE_HIERARCHY: UNDO      AT 08:17:31.5248247
66   >CREATE_HIERARCHY: SUCCESS   => 7009.00177257165 MS
67   □<CREATE_HIERARCHY: SUCCESS  => TRUE|ROLLBACK|CR|EXPORT 2  [7014.35196372723 MS]
122  +PROCESS [PHASE|TAG: AUTO_BLOCK => TRUE|ROLLBACK|CR|EXPORT 2  [7014.35196372723 MS]
123  <ABLOCK.AUTO_BLOCK: SUCCESS  => 34702.9197844978 MS
124  >IMPORT_HIERARCHY: GO        AT 08:17:38.5389032
125  +IMPORT: C:\USERS\WW\USERDESKTOP\GRAT\FGR ACCESS TESTFRAMEWORK\BIN\DEBUG\EXPORT\HIERARCHY2.AAPKG [9683.75100746045 MS]
126  <IMPORT_HIERARCHY: SUCCESS   => 9895.30862162649 MS
127  >SYNC: GO                    AT 08:17:48.4347906
128  <SYNC: SUCCESS               => 51.28000164825 MS
129  >UBLOCK: GO                  AT 08:17:48.4867924
130  >DEPLOY_BLOCK: GO            AT 08:17:48.4887929
131  >DEPLOY_HIERARCHY: GO        AT 08:17:48.4887929
132  +DEPLOY_INSTANCE: PLATFORM_2 => CASCADE       [94926.5569367056 MS]
133  <DEPLOY_HIERARCHY: SUCCESS   => 94929.5971275679 MS
134  <DEPLOY_BLOCK: SUCCESS       => 94931.7735913363 MS
135  >SYNC: GO                    AT 08:19:23.4252710
136  <SYNC: SUCCESS               => 9737.1285316989 MS
137  <UBLOCK: GO                  AT 08:21:00.7659720
138  >DEPLOY_BLOCK: UNDO          AT 08:21:00.7659720
139  >DEPLOY_HIERARCHY: UNDO      AT 08:21:00.7659720
140  +UNDEPLOY_INSTANCE: PLATFORM_2 <= CASCADE[52868.590840456 MS]
141  <DEPLOY_HIERARCHY: SUCCESS   => 52868.8841738266 MS
142  <DEPLOY_BLOCK: SUCCESS       => 52869.169964339 MS
143  >UBLOCK: SUCCESS             => 52868.7206055518 MS
144  >SYNC: GO                    AT 08:21:53.6366897
145  <SYNC: SUCCESS               => 11502.0145018431 MS
146  >DELETE_HIERARCHY: GO        AT 08:22:05.1397634
201  □<DELETE_HIERARCHY: SUCCESS  => 18217.5812847722 MS
202  <BULKOPS.THREAD: SUCCESS     => 319518.6736672213 MS
```

FIG. 31

```
<run sync_points="5">
    <thread id="1">
        <sync id="2"/>
        ...
        <sync id="4"/>
        ...
        <sync id="5"/>
    </thread>

<thread id="2">
        <sync id="1"/>
        ...
        <sync id="3"/>
        ...
        <sync id="5"/>
    </thread>

<thread id="3">
        <sync id="1"/>
        ...
        <sync id="4"/>
        ...
        <sync id="5"/>
    </thread>
```

LOAD TEST FRAMEWORK

RELATED APPLICATIONS

This application is a Continuation Application of U.S. patent application Ser. No. 15/842,969, filed Dec. 15, 2017, titled "LOAD TEST FRAMEWORK," the entire contents of which are incorporated herein by reference.

FIELD

The present disclosure is related to a method and system for testing operations of objects on a system, or more specifically, to a script-driven framework through which to create and execute a test scenario for testing operations of objects on the system.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. Examples of such systems are the well-known Wonderware INTOUCH® human-machine interface (HMI) software system for visualizing and controlling a wide variety of industrial processes and the ArchestrA™ (e.g., the application server or AppServer for INTOUCH™) comprehensive automation and information software open architecture designed to integrate and extend the life of legacy systems by leveraging the latest, open industry standards and software technologies.

Existing technologies, such as enabling logging and scrubbing logs, are often inadequate to properly test and evaluate such complex systems or components thereof, such as, for example, ArchestrA™ objects, because of the potential for user error, or additional performance degradation precipitated by the logging technology. Existing technologies also do not offer a suitable, user friendly approach to assess the impact between operations on objects which are executing in parallel on separate threads in an application environment.

SUMMARY

To address these and other issues, a dynamic, configurable and customizable, multi-threaded system and method are provided as a framework, which allows a user to design, author and implement a test scenario(s) for monitoring the performance metrics of operations on different sets of objects on a target system, and to store and output performance metric data of those operations on the object sets that are performed either sequentially, or in parallel, separate threads, in an easily digestible notation, conducive to being depicted graphically. The framework includes Extensible Markup Language-compliant language elements, facilitating the authoring of intuitive and self-explanatory scripts, and a rich set of options that greatly customize the runtime experience. The framework espouses robust precepts of object-oriented-design, making it greatly extensible, and a candidate for even general purpose use. Using this script-driven framework, a user can design and author a declarative and reusable test scenario that defines a template for a hierarchy of objects, and blocks of executive directives that construct, operate on and supplement, and deconstruct those hierarchies either sequentially, or in parallel. Flow-control directives built into the language lend a great deal of predictability to when individual operations fire, allowing for the gathering of focused performance metrics. A rich set of runtime options and parameters allows the user experience to be greatly customized, while greatly promoting the reusability of scripts. Exercising the framework, therefore, commences with the authoring of a script file, replete with declarative and executive elements, executing the script with runtime options optimized to meet a given set of requirements, and preserving the output performance data for subsequent analysis.

Such a framework can, for example, address the problem of quantifying the effects on performance of a set of operations on a set of objects using a published toolkit, on operations that are executed in parallel on different sets of objects, using the same toolkit. In this way, a user can qualitatively and quantifiably observe the effects of subjecting one set of objects to a configurable series of actions on the performance of a target-set of operations on a designated set of target objects, with a view to identifying lapses in object and module reentrancy. For example, through such a framework, a user can more easily design and implement stress-test interaction, such as by using GRAccess Toolkit with the Wonderware™ Application Server galaxy and the ArchestrA™ objects it houses, with an intuitively simple scripting language. The user can create two or more hierarchies of objects, and subject each to a distinct set of operations, benchmarking and timing each with a view to determining blocking GRAccess operations—i.e., operations on one set that block operations on the other(s).

In accordance with an example embodiment, a computer-implemented method and system to monitor performance of operations on two or more sets of objects to be executed on a target system in sequence, or in parallel or separate threads, in accordance to a test scenario stipulated in a script file (e.g., language stipulations of runtime options, parameters, etc.). The language stipulation allows for the declaration of hierarchies of objects, and the executive directives that operate on them. The language stipulations allows for the definition of one or more synchronization points corresponding to points in time at which operations on the separate threads are to be synchronized, an essential requirement of any benchmarking framework. The operation of executing the script file includes creating the two or more sets of objects on respective separate threads; executing operations on each of the two or more sets of the objects on a separate thread in parallel with each other according to the operation hierarchy, the operations on the separate threads being executed in synchronization at or from at least one synchronization point; collecting and storing in memory performance metric data on the operations of the objects for each of the two or more sets of objects according to an order of execution and termination of an object to maintain the performance metric data in relations to the operation hierarchy of each of the two more sets of objects; deleting the two or more sets of objects; and terminating execution of the separate threads. The framework can be XML-compliant.

The operation hierarchy can define an order of the objects and/or operations thereto, including parent-child relationships. The operation hierarchy can define a structural blueprint for hierarchies of objects to be subjected to parallel sets of operations, and outlines individual threads of operation to act on the distinct object hierarchies to be created according to the defined blueprint.

The target system can be a supervisory control and data acquisition system.

The execution of operations on one of the separate threads is delayed or idled to synchronize execution at the synchronization point with operations of another of the separate threads.

The method and system can further include executing the script file in a dry run mode to validate the script file without having to perform the operations on the two or more sets of objects on the target system.

The performance metric data can include at least data corresponding to an execution time for the operations on each object from the two or more sets of objects. The performance metric data can be separately stored in memory for each set of objects or each separate thread. The collecting and storing operations can include querying a register to obtain values corresponding to performance metric data for the operations on each set of objects executing on a respective one of the separate threads, and storing the obtained values corresponding to the performance metric data on a separate stack for each one of the separate threads or each separate thread.

The method and system can further include reading out the stored performance metric data for the operations on each object in each set of objects in relations to the order of execution and termination; and outputting information relating to the performance metric data for the two or more sets of objects. The outputting operation can display the information relating to the performance metric data for the two or more sets of objects in an expandable and collapsible tree format reflecting the operation hierarchy for the objects within the same set. The outputting operation can output a thread-by-thread breakdown of information corresponding to the performance metric data for the operations on the two or more sets of objects. The outputting operation can display the information in relations to the operation hierarchy and in at least one common time frame defined by the synchronization point.

The method and system can further involve receiving script inputted by a user through a user interface to define the language stipulations for the test scenario for the target system; and storing the script in a script file which is used by the framework as a structural blueprint to control the creating, executing, collecting and storing, terminating and deleting operations during a test run of the test scenario.

The framework can provide a set of predefined language stipulations in script form which are selectable by a user to define the test scenario, the predefined language stipulations can include predefined directives, expressions and attributes.

Furthermore, access to ArchestrA objects can fall in two broad categories: configuration, and runtime. The latter is a system for querying and altering the state of a running system (such as an oil refinery that is running and operational). The GRAccessTestFramework can confine its attentions to the configuration domain of ArchestrA objects: Creating, extending, modifying, and deploying (i.e., assisting in the transition of objects across the config-runtime barrier) objects. An object in ArchestrA AppServer parlance is a fully self-contained unit of state and logic that executes within its namespace, while communicating subscribed and exigent information with peer objects using an indigenous protocol. Thus, while the framework supports the deploy directive, its interactions with objects can remain in the config domain.

DESCRIPTION OF THE FIGURES

The description of the various example embodiments is explained in conjunction with the appended drawings, in which:

FIG. 7 illustrates a Table A showing the various examples of on error clauses and their effect, in accordance with an example embodiment of the present disclosure.

FIGS. 8 and 9 illustrate a Table B showing example elements that may feature in the <setup_hierarchy>section, in accordance with an example embodiment of the present disclosure.

FIG. 10 illustrates a Table C showing examples of control-flow directives that are common to both the setup and run sections, in accordance with an example embodiment of the present disclosure.

FIG. 11 illustrates a Table D showing examples of attributes for the run directive, in accordance with an example embodiment of the present disclosure.

FIGS. 12 and 13 illustrate a Table E showing examples of additional directives supported by the run directive, in accordance with an example embodiment of the present disclosure.

FIG. 15 illustrates a Table F showing examples of events and their pre- and post-handler XML direction, in accordance with an example embodiment of the present disclosure.

FIG. 16 illustrates an example of a trace output for a test run of a test scenario executed in a dry run mode to validate the test scenario (or script file of the test scenario), in accordance with an example embodiment of the present disclosure.

FIGS. 18 and 19 show an example structure of a script for a test scenario, in accordance with an example embodiment of the present disclosure.

FIG. 22 is a portion of window-based user interface showing an example subdirectory "trace" which stores trace logs for each separate thread, in accordance with an example embodiment of the present disclosure.

FIG. 23 is a portion of window-based user interface showing an example subdirectory "output" which stores output data when a test scenario is executed, in accordance with an example embodiment of the present disclosure.

FIG. 24 is a portion of window-based user interface showing an example subdirectory "export" which stores data when an object is exported, such as a package file (.aaPKG) containing information about the object, in accordance with an example embodiment of the present disclosure.

FIG. 25 is a window-based user interface showing an example output when the—r chatty command-line option is invoked for an executing script for a test scenario, in accordance with an example embodiment of the present disclosure.

FIG. 26 is a window-based user interface showing example output when an example command-line option is invoked for an executing script for a test scenario, in accordance with an example embodiment of the present disclosure.

FIGS. 27 and 28 illustrate a Table G showing examples of command-line switches, in accordance with an example embodiment of the present disclosure.

FIG. 30 is an example of information from a trace file for a first thread, such as a thread labeled Looper, for a test scenario when the script is executed, in accordance with an example embodiment of the present disclosure.

FIG. 31 is an example of information from a trace file for a second thread, such as a thread labeled BulkOps, for a test scenario when the script is executed, in accordance with an example embodiment of the present disclosure.

FIG. 32 illustrates an example of the various sync points defined for different threads, in this case three different threads in accordance with an example embodiment of the present disclosure.

Figure 33:
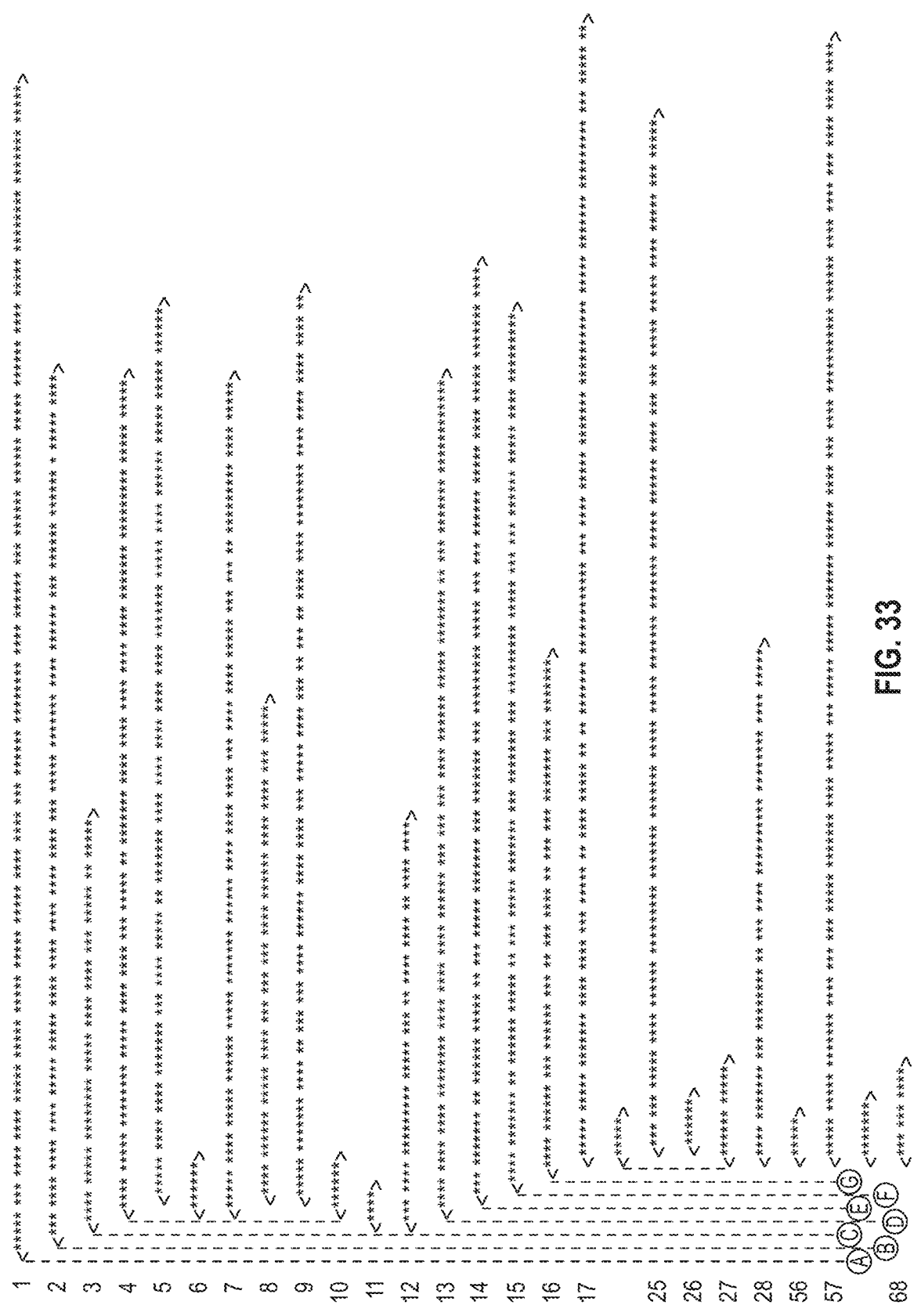
Figure 33:
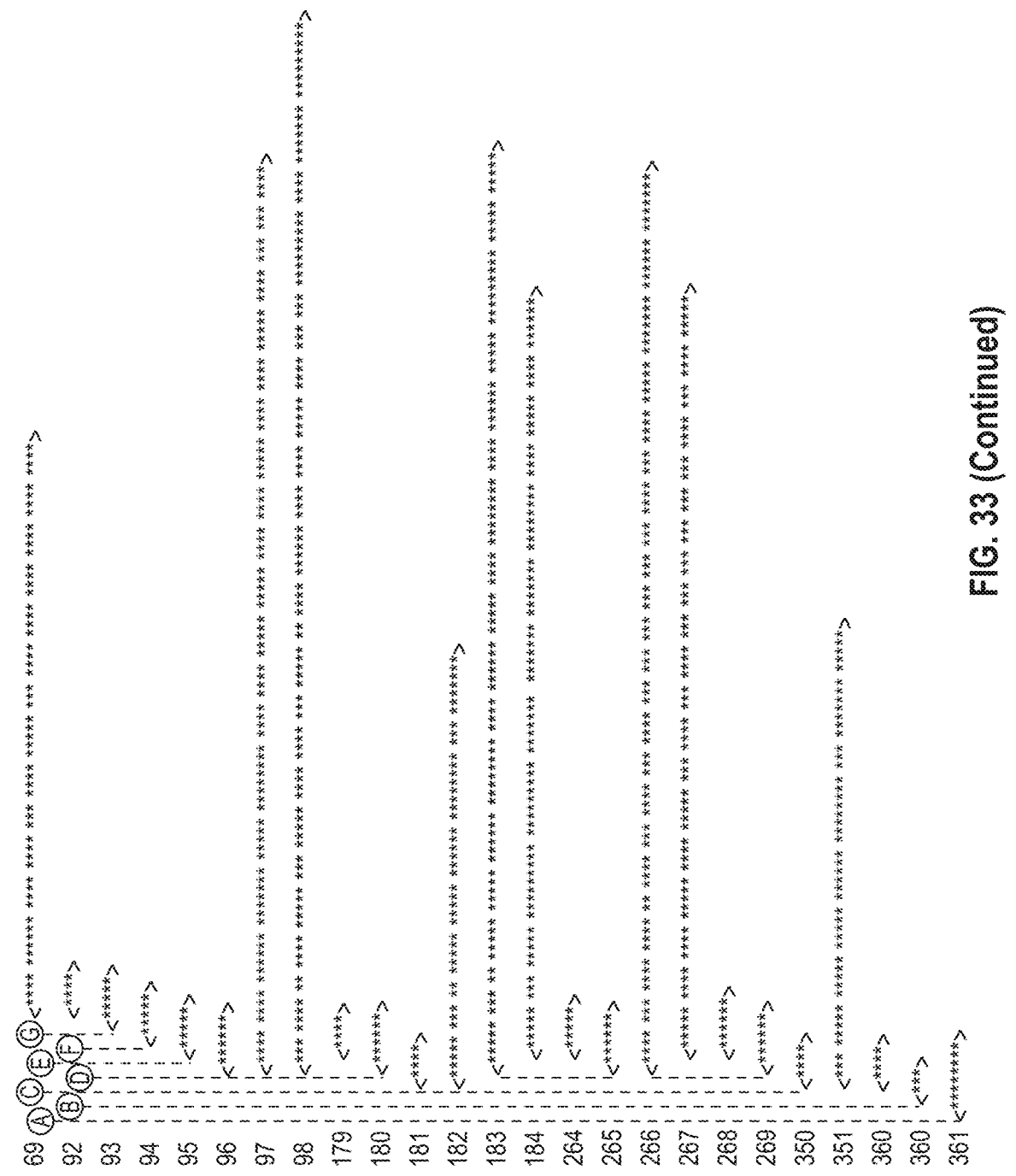

FIG. 33 illustrates an example output from a framework, such as GRAccess Test Framework, showing a thread-by-thread breakdown of performance metrics, in accordance with an example embodiment of the present disclosure.

DISCUSSION OF EXAMPLE EMBODIMENTS

A computerized system and method are provided which utilizes a script-driven framework that allows a user to customize performance testing of operations on objects, such as application objects, on a system or its subsystem (hereinafter referred to as "target system"). The framework interacts or is part of an object-based management system, which manages various services, including, for example, diagnostics, runtime management, security, alarming, history and other services through a set of applications including object-based application(s) to be tested.

The script syntax of the framework can be XML-compliant, which makes for scripts that are easy to read and write, while allowing structural errors to be identified, for example, by the Microsoft XML parser or other XML parsers. The method and system provided through the framework also defines a definition and execution system, and the script language allows for distinct hierarchies of objects to be defined which are subjected to distinct operations (e.g., operation hierarchy).

The script language supports various types of expressions, including attribute references and complex operator-driven expressions, which add a great deal of dynamism to the functionality provided through the framework. The script language includes flow-control constructs that enable synchronization between executing threads, and permit the specification of conditional, iterative, and reversible (rollback) logic. Command-line switches complement language features to make script execution dynamic and flexible.

When the script is executed to implement a test run of the test scenario, performance metric data (also referred to as "performance data") can be gathered with no significant overhead added to the operation being measured. Collecting and recording performance data can be a simple matter of querying a register or the like, such as Windows performance register, and saving that value on a stack in memory. For example, after the script runs through to completion, the performance details are popped off the stack and presented in human readable form (e.g., displayed) to a user. Performance data, being aggregated upward, from micro to macro level, can be presented in such a way as to allow a user to "dig into" operations with degraded performance.

A separation of form and function allows scripts to be executed in a "dry run" mode, allowing users to test and sanitize their scripts before actually running them on a target system. This separation also makes it easy to replace existing toolkits, such as GRAccess Toolkit by Schneider Electric or other similar toolkits, as the back-end, thereby providing a general-purpose framework, if desired.

I. Architecture

Figure 1:
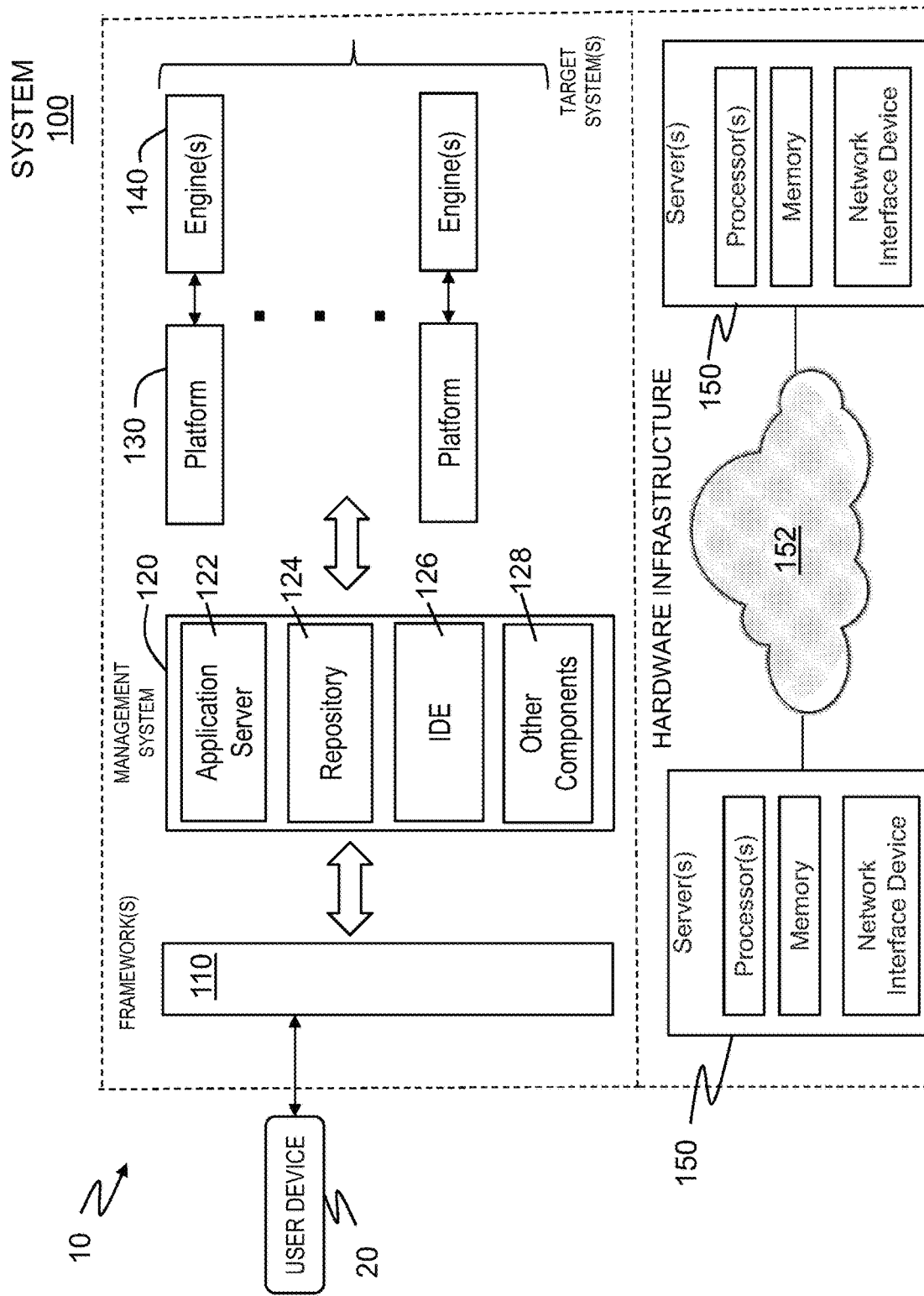
FIG. 1 illustrates an example computing architecture with a script-driven framework through which a user can design, create and execute a test scenario to monitor performance metrics of operations on sets of objects executable on separate threads in parallel on a target system, in accordance with an example embodiment of the present disclosure.

FIG. 1 illustrates an example of a computing architecture 10 through which a script-driven framework is provided to facilitate testing, such as for example load testing, of objects on a target system. The architecture 10 includes a system 100, and a user device 20 through which a user can interact with the system 100 and its components to access services and processes provided through the system 100. The system 100 includes a management system 120. The management system 120 can be configured to centrally manage various services and processes including, for example, diagnostics, runtime management (e.g., of automated production processes, etc.), security, alarming, history and other services through a set of applications which include object-based applications. The applications together can be part of a control and data acquisition infrastructure over hardware or devices (e.g., programmable logic controllers (PLCs), remote terminal units (RTUs, sensors, etc.) of a facility such as an industrial system(s) or plant(s) (e.g., industrial automation system, automated processing system, etc.). The control and data acquisition infrastructure can be a supervisory control and data acquisition (SCADA)-based infrastructure.

The management system 120 can include: an application server(s) 122 to serve as a supervisory control platform, which manages a set of applications to provide the various services and processes, a repository (or repositories) 124 to maintain configuration information for the applications (e.g., templates, applications/objects, etc.); an integrated development environment (IDE) 126 to serve as an interface for the user configuration side of the application server 122 and other components through which the user can configure the applications including its various functions and operations over hardware and devices of the facility or other systems; and other software components 128 (e.g., other toolkits, human machine interface (HMI) to interact with the components of the system 100, and other software applications). As will be discussed in more detail below, in one example, the management system 120 manages the entirety of the applications, such as in the form of a Galaxy, using the Wonderware™ and ArchestrA™ family of products by Schneider Electric (or Invensys Ltd which is now part of Schneider Electric).

The system 100 also includes a framework 110 which interacts with the management system 120 and the user device 20. The framework 110 is a script-driven framework through which a user can design and create an XML-compliant scenario to test the performance of operations on objects to be performed on a target system, (e.g., the entirety of the applications or subsystems thereof), which is implemented and managed through the management system 120. The script-driven framework can provide the following functions and features:

Providing a user interface through which a user, via the user device 20, can design and create a test scenario using an XML-compliant script that uses declarative constructs to define two or more sets of objects, and the operations to be performed on them in parallel on separate (or different) threads, with one or more synchronization points to help the threads coordinate between themselves;

Providing a predefined template (e.g., sections to define hierarchy, threads, etc.) for creating a script file for a test scenario, and script language definitions including predefined script naming conventions for specific language stipulations including specific functions, constructs, and features (e.g., directives, attributes, expressions, etc.);

Storing the script of the test scenario as a script file(s) in memory;

Performing a test run of the test scenario using the script file(s), e.g., executing the script file(s), to collect and store performance metric data for operations on each thread for each set of objects;

Performing a dry run of the test scenario using the script file(s), e.g., executing the script file(s), to validate the script without having to interact with the target system;

Providing Command-line switches;

Outputting or facilitating the output of performance metric data associated with the operations on the separate sets of objects executed on the separate threads; and Providing other functions and features described herein.

The various components such as the framework 110, the management system 120 and its components, the platform(s) 130 and the engine(s) 140 may operate on one or more computers (or computerized systems) 150, such as servers or the like. The computers 150 may be connected across a network(s) 152, and include at least a processor(s) (e.g., CPUs), memory, and network interface device(s) or NIDs.

When the computer(s) 150 executes, via its processor(s), applications (including concurrent and distributed application(s)) stored in the memory, the processor and memory of the computer(s) 150 provide the script-driven framework and its functions and features including the design, creation and storage of a test scenario (in a script file) and execution of the test scenario on a target system, and perform other functions, operations or steps described herein (including for other components of the system 100) in accordance with the various embodiments of the present disclosure. The application server 122 can, for example, operate currently and in a distributed manner across the computers 150.

Figure 2:
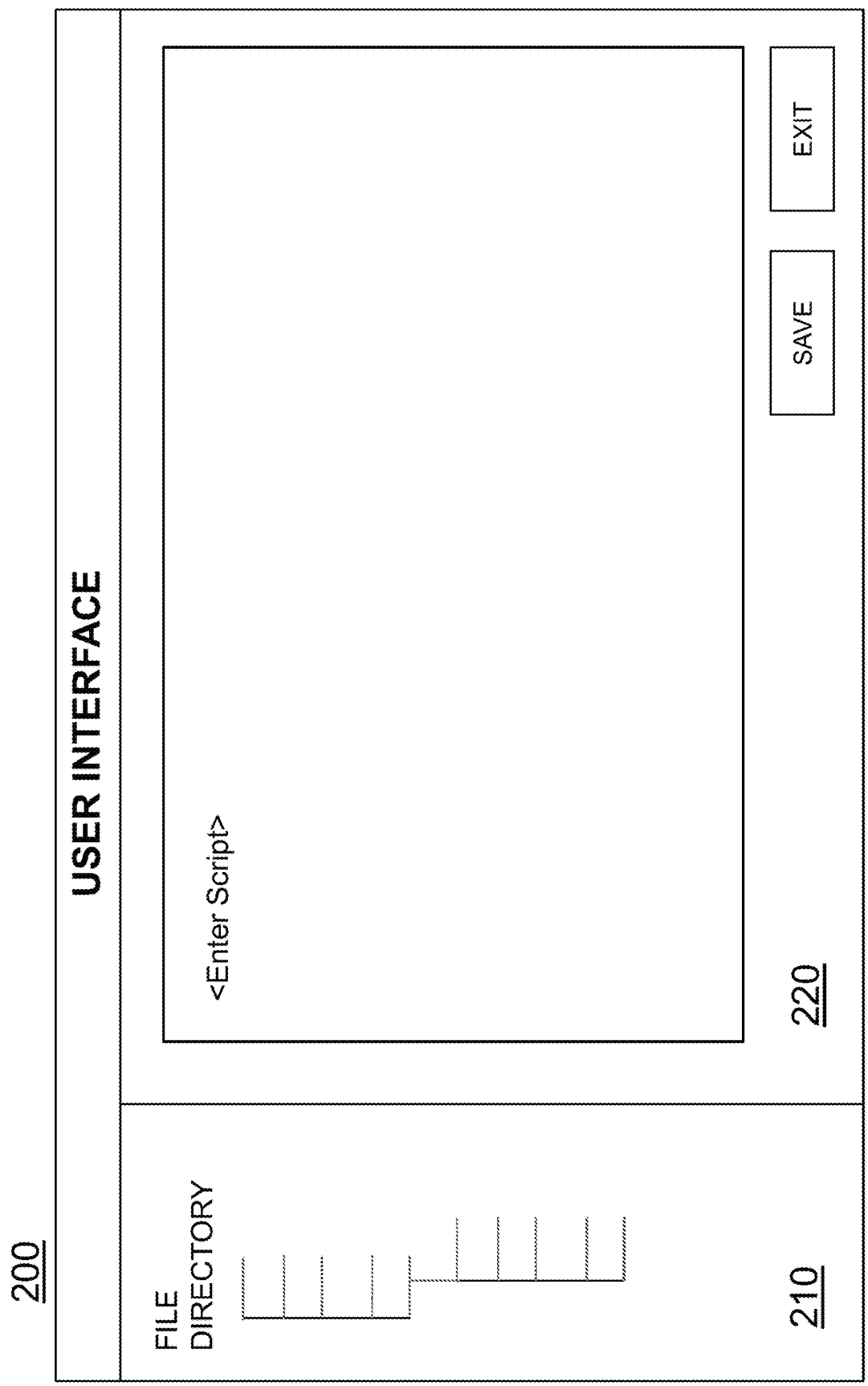
FIG. 2 is an example of a simple graphical user interface (GUI) through which a user can input source script, such as Extensible Markup Language (XML), to define test scenario and its language stipulations and to create a script file executable through the framework in the architecture of FIG. 1, in accordance with an example embodiment of the present disclosure.

The user device 20 can also include at least a processor(s) (e.g., CPUs), memory and NIDs to interact with the framework 110 and the management system 120, via the network(s) 152. As shown in FIG. 2, an example graphical user interface (GUI) 200 can be provided to the user through the user device 20. The GUI 200 can be a Windows-based environment, which includes an area 210 showing a directory of files, and an area 220 to input script to define language stipulations (e.g., objects, threads, directives, expressions, attributes, etc.) for a test scenario which can be saved as a script file. Other functions and features may be available through the GUI 200 to implement the various functions and features described herein.

II. Example Processes

Figure 3:
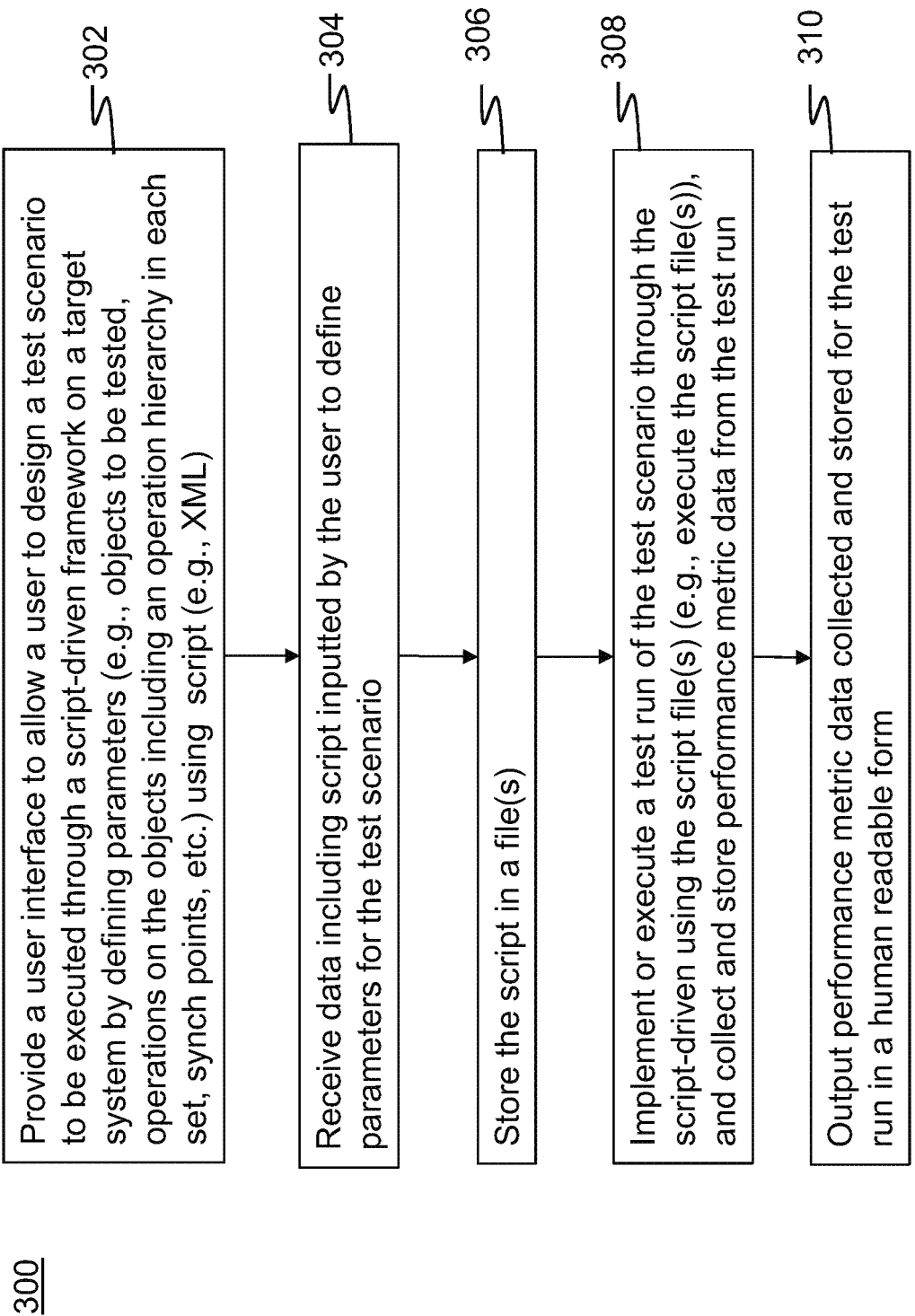
FIG. 3 is a flow diagram showing an example process by which a user can create a script file which is executable through the framework to implement a test scenario on a target system, in accordance with an example embodiment of the present disclosure.

FIG. 3 is a flow diagram showing an example process 300 by which a user can input script to create a script file which is executable through the framework in order to implement a test scenario on a target system, in accordance with an example embodiment of the present disclosure. At reference 302, provide a user interface to allow a user to design a test scenario to be executed through a script-driven framework on a target system. The user can define language stipulations (e.g., objects to be tested, operations on the objects including an operation hierarchy in each set, directives, expressions, attributes, sync points, etc.) using script, such as XML-compliant script.

At reference 304, receive data including or corresponding to the script inputted by the user in order to define language stipulations for the test scenario.

At reference 306, store the script in a file

At reference, 308, implement or execute a test run of the test scenario through the script-driven framework using the script file (e.g., execute the script file), and collect and store performance metric data from the test run.

At reference 310, output performance metric data collected and stored for the test run in a human readable form. As described herein, the performance metric data can be outputted according to the operation hierarchy, including for example on a thread-by-thread basis.

Figure 4:
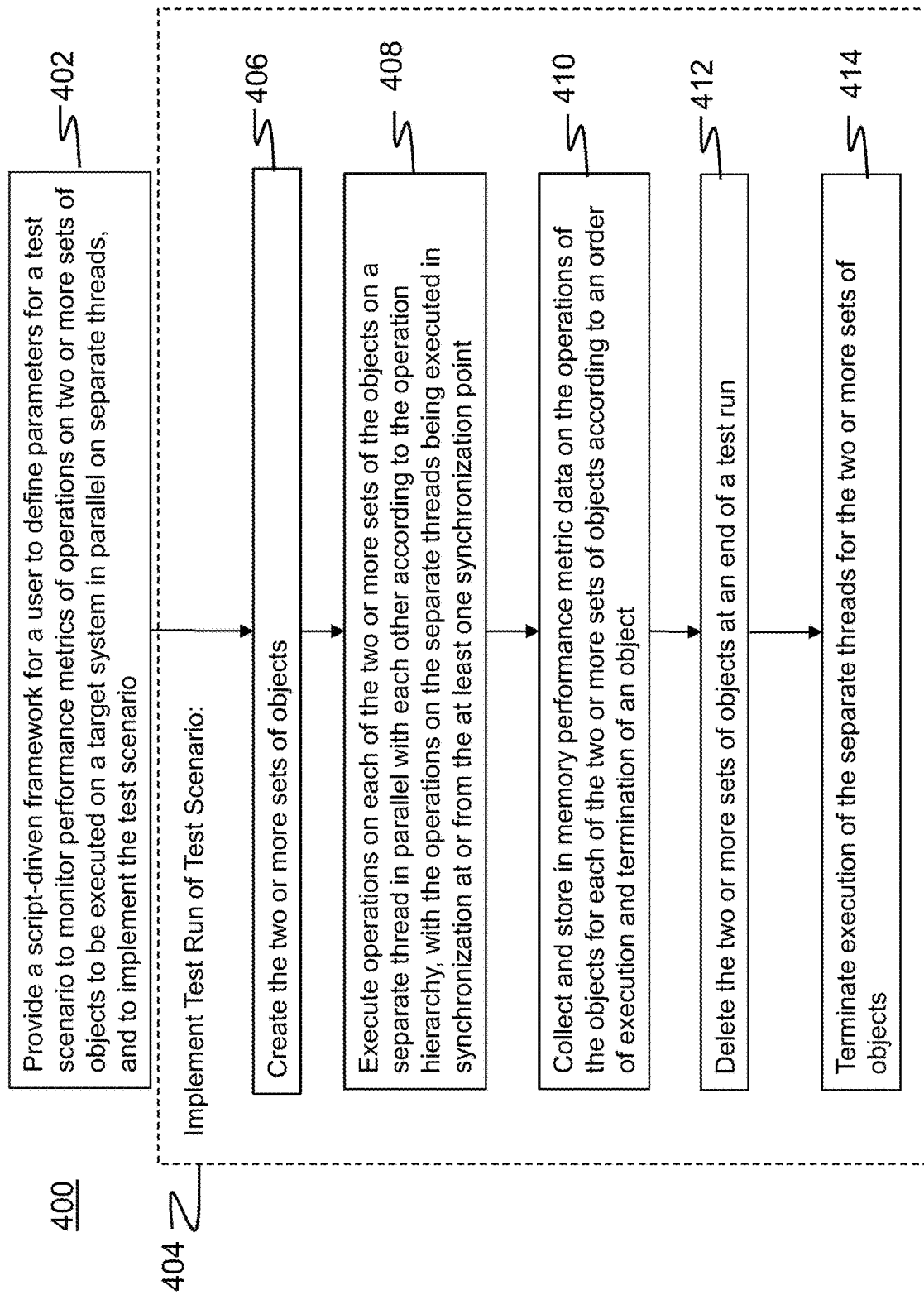
FIG. 4 is a flow diagram showing an example process by which a test run of a test scenario is implemented to store and collect performance metric data on two or more sets of objects to be executed on separate threads in parallel for a target system, in accordance with an example embodiment of the present disclosure.

FIG. 4 is a flow diagram showing an example process 400 by which a test run of a test scenario is implemented to store and collect performance metric data on two or more sets of objects to be executed on separate threads in parallel for a target system, in accordance with an example embodiment of the present disclosure. At reference 402, provide a script-driven framework for a user to define language stipulations for a test scenario to monitor performance metrics of operations on two or more sets of objects to be executed on a target system in parallel on separate threads and to implement the test scenario.

At reference 404, implement a test run of the test scenario through the framework, such as by executing the script file for the test scenario. The implementation can involve several operations. For example, at reference 406, create the two or more sets of objects. For each executing thread, the creation operation can involve setting up a hierarchy of the objects according to an operation hierarchy (e.g., setting up object hierarchy). At reference 408, execute operations on each of the two or more sets of the objects on the separate thread in parallel with each other according to the operation hierarchy, with the operations on the separate threads being executed in synchronization at or from at least one synchronization point.

At reference 410, collect and store (in memory) performance metric data on the operations of the objects for each of the two or more sets of objects according to an order of execution and termination of an object. Performance metric data can be stored separately for each thread, such as for example in a trace file or other type of output file. For example, collection and storage may involve querying a register or the like, such as Windows performance register, and saving that value on a stack in memory.

At reference 412, delete the two or more sets of objects at an end of a test run for the test scenario.

At reference 414, terminate execution of the separate threads for the two or more sets of objects.

Figure 5:
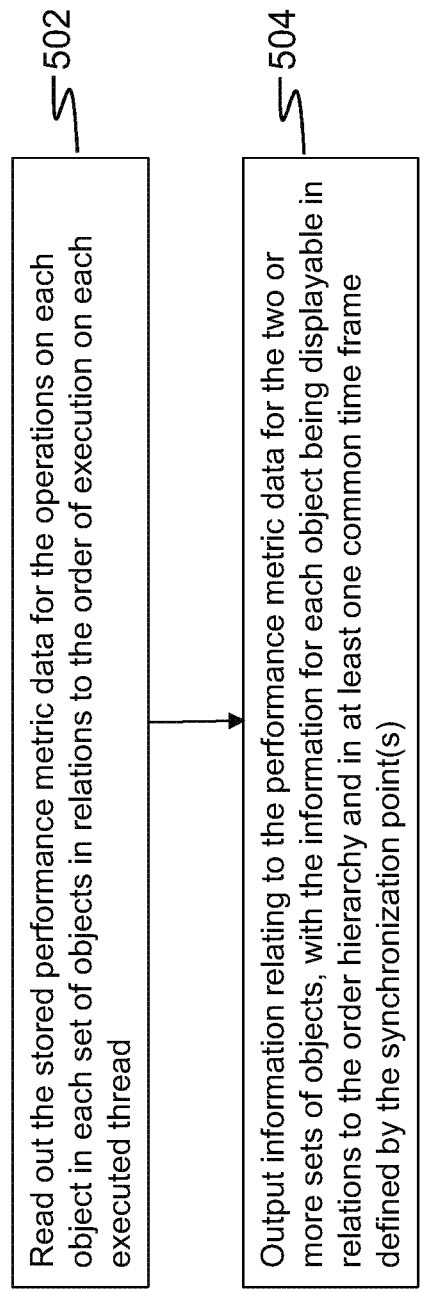
FIG. 5 is a flow diagram showing an example process by which performance metric data of a test run of a test scenario is outputted in a human readable format, in accordance with an example embodiment of the present disclosure.

FIG. 5 is a flow diagram showing an example process 500 by which performance metric data of a test run of a test scenario is outputted in a human readable format, in accordance with an example embodiment of the present disclosure.

At reference 502, read out the stored performance metric data for the operations on each object in each set of objects in relations to the order of execution on each executed thread. At reference 504, output information relating to the performance metric data for the two or more sets of objects, with the information for each object being displayable in relations to the order hierarchy and in at least one common time frame defined by the synchronization point(s).

For example, after the script runs through to completion, the performance details are popped off the stack and presented in human readable form (e.g., displayed on a user interface). Performance data, being aggregated upward, from micro to macro level, can be presented in such a way as to allow a user to "dig into" operations with degraded performance.

III. Example Framework Features

An example of the various aspects of a script-driven framework, such as the framework 110 in FIG. 1, and implementation thereof are provided below. In this example, the framework is provided to interact with components of a management system (e.g., 120 in FIG. 1), such as one which is provided through the Wonderware™ and ArchestrA™ family of products by Schneider Electric (or Invensys Ltd which is now part of Schneider Electric), including for example Wonderware™ Application Server, the ArchestrA™ IDE, the Galaxy Repository Access (GRAccess) Toolkit and other Wonderware™ and ArchestraA™ products (e.g., Historian, InTouch HMI, InBatch, etc.) or the like.

Figure 6:
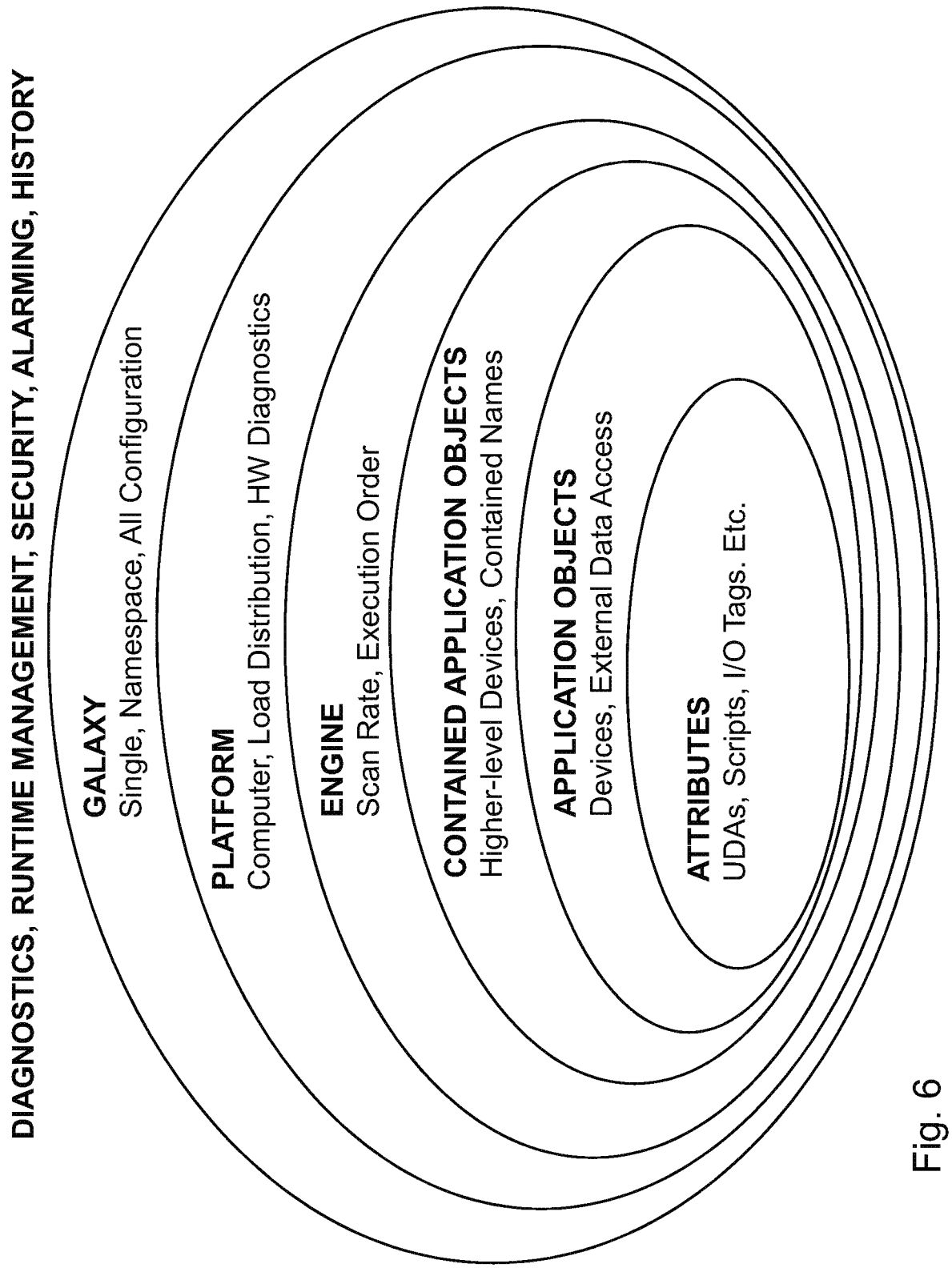
FIG. 6 illustrates an example diagram showing the relationships between different components within a galaxy (or an entire application) such as in an ArchestrA™ system which includes a single logical namespace (defined by the Galaxy Database) and a collection of platforms, engines, objects and attributes, in accordance with an example embodiment of the present disclosure.

For example, the application server 120 can be a Wonderware™ Application Server, the repository 124 can be a galaxy repository, the IDE 126 can be an ArchestraA™ IDE. Developers can use the development environment to leverage the application server 120 to manage I/O servers, alarms, history, security and applications distribution. Through these components, the management system can manage the entirety of the applications, such as in the form of a Galaxy (or Galaxies). FIG. 6 illustrates a diagram of a Galaxy, its associated components (e.g., platform(s), engine(s), application object(s), and attribute(s)), and the relationships therebetween.

A Galaxy is an entire application, which is a complete system built on the ArchestrA™ technology consisting of a single logical namespace (defined by the Galaxy Database) and a collection of Platforms, Engines, and objects. The Galaxy represents one or more networked computers (e.g., PCs) that constitute an automation system.

A Platform (or platform object) represents the physical hardware on which the Industrial Application Server software is running.

An Engine (or engine object) is a logical entity that provides the infrastructure services for hosting process devices. For the engine, all historical data can be stored in the IndustrialSQL Server historian to provide real-time data to clients such as ActiveFactory, SuiteVoyager, and so on. All ArchestrA™ objects can be configured to send data for storage in an InSQL database.

An Application Object (e.g., an automation object) is a type of object that represents devices, such as permanent things in a plant (e.g., manufacturing plant, etc.) or other system as objects with user-defined, unique names within the Galaxy. It provides a standard way to create, name, download, execute, and monitor the represented component. A Contained Application Object is, for example, associated with higher-level devices, and Application Object is, for example, associated with lower-level devices.

An Attribute is a data property, such as for an Application Object.

An Area is a logical grouping of AutomationObjects that represents an area or unit of a plant. It is used to group related AutomationObjects for alarm, history, and security purposes. It is represented by an Area AutomationObject.

An Area Object is the System Object that represents an Area of a facility (e.g., a plant, etc.) within a Galaxy. The Area Object acts as an alarm concentrator, and is used to place other Automation Objects into proper context with respect to the actual physical automation layout.

An AutomationObject is a type of object that represents permanent things in the facility (such as Application Objects or Device Integration Objects) as objects with user-defined, unique names within the Galaxy. It provides a standard way to create, name, download, execute, and monitor the represented component.

An Automation Object Server (AOS) is a computer that hosts one or more application engines and associated automation objects. An Industrial Galaxy Namespace can contain several Automation Object Servers, each which requires a Platform.

The various functions and features of an example of the framework will be described in greater detail below, and include example implementations of source script, objects, directives, expressions, attributes, synchronization points, outputs and other aspects and features provided through a script-driven framework which is XML-compliant. The framework can work in combination with GRAccess Toolkit as a specific framework, or can be a general purpose framework.

A. Script Source

As previously discussed, the framework executes script, such as from a script file, to implement a test run of a test scenario on sets of objects. In this example, an XML-compliant file can seed a test run, such as a GRAccess stress-test run, in two stages. First, the script file can define a structural blueprint for the hierarchies of objects to be subjected to parallel sets of operations. Next, the script file can outline the individual threads of operation to act on the distinct object hierarchies created from the defined blueprint.

The source script can conform, for example, to the following outline:

```
<GRAccessLoadTest num_threads="2">
<!-- Declare DLLs used by the script -->
<dll UtilityDLL="StringUtil.DLL" MyEvents="GRAccessEvents.DLL"/>
<defaults/> <!-- Set defaults -->
<expressions/> <!-- define non-trivial expressions -->
<setup hierarchy>
<!—Setup directives -->
</setup hierarchy>
<run>
<!-- Execution directives, spread across multiple threads -->
<thread label="one">
</thread>
<thread label="two">
</thread>
</run>
</GRAccessLoadTest>
```

XML directives help to describe each section of the script. Directives may be nested, or may appear as peer nodes in each section. A parent-child relationship is ascribed to elements that are nested, in which event the execution of a child is predicated on the successful execution of its parent. Elements at the same level are processed sequentially (with the "on error" clause, described below, determining control flow in the event of failure). XML elements may also specify attributes, which may be referenced by descendent elements of the same lineage.

Two elemental attributes are "label" and "on error". The former ascribes a formal handle to an element, allowing its attributes to be referenced by name by descendent elements. The latter defines a stipulation on processing subsequent peer nodes of a node whose execution fails.

The elemental attribute on error can accept three values: (1) "stop" (default)—causes the immediate termination of the thread (the other threads continue to run through to completion) with a failing condition; (2) "skip"—skips processing subsequent [child] nodes and their descendants; and (3) "continue"—ignores error and continues processing the remaining child nodes.

Consider the following example block of instructions, executed in a loop:

```
<loop count="10">
<d1/>
<d2>
<c2_1/>
<c2_2/>
</d2>
<d3 on_error="?">
<c3_1/>
<c3_2/>
</d3>
<d4>
<c4_1/>
<c4_2/>
</d4>
</loop>
```

The effect of the various on error clauses can be examined in the event that directive c3_1 returns with an error.

The various clauses and their effect are provided in the following Table A of FIG. 7.

B. The Root Element

The root element stipulates the total number of hierarchies to be supported by the framework through the num threads attribute. This attribute also determines the maximum number of threads of operation (e.g., <thread> directives) that may be specified in the <run> directive.

Another root attribute, "cwd" (or current working directory), determines the directory under which the script should or must be executed. All output, if enabled with the /o command line switch, and a trace file specification, is produced in directories relative to the configured cwd. Import and export files, specified with the file attribute, are also sought relative to the prevailing current working directory if not qualified with an absolute path. The root attribute cwd may be overridden with the /w (for working directory) command-line switch; if left unspecified, cwd defaults to "." (cwd=".").

C. The DLL Directive

The framework allows methods defined in external DLLs (Dynamic Link Library or Libraries) to be invoked by execution elements of the script, as events, or from within unary expressions. The <dll> declarative element allows for the inclusion of such DLLs. The label associated with individual DLLs serves as the alias through which they are referenced in the script.

D. The Defaults Directive

Attributes defined in the defaults section of the script file are globally accessible throughout the script, such as the user's script. It is recommended to use this section to define defaults for loop counts and sleep durations used in the script. Attribute definitions in the <defaults> section may be overridden with the command-line switch /v at runtime.

E. The Expressions Directive

While expressions are covered further below, a brief explanation is in order. Expressions are evaluated dynamically, allowing the execution of the script to be altered at runtime. Expressions can be quite complex in nature, and have the potential to make for difficult reading. Reusable, and more convoluted, expressions may be defined in the <expressions>directive, to be accessed elsewhere in the script.

Consider the following example:
<expressions next="!{#{curr}+1}" is even="?{{0}% 2 eq 0}" less than 5="?{{0} lt 5}"/>

The expressions defined may be used in an execution block of the script by name. The expressions "is_even" and "less than_5" are examples of expressions that are realized with arguments to replace the placeholders {0} ({1}, {2}, . . . ). Named expressions may be referenced by executing elements of a script by enclosing them between "*{" and "}", as in ""{next}". Some named expressions, such as is_even, is supplied with supplemental data when referenced, such as: "{is_even:#{curr}}" ("#{curr}" replaces {0} in the expression definition). Arguments are specified as a comma separated list; user-defined expressions may be referenced using the following syntax: "*{UD_expression_ID:arg1,arg2, . . . }".

F. The Setup Hierarchy Directive

The "Setup Hierarchy" section identifies the actual hierarchy of objects that the framework must create for its operations. It is incumbent on the user to ensure that there is no duplication of names across the hierarchies. The use of expressions, and static and dynamic attribute references (e.g., XML, attribute references) make it possible for the user to do so. Control-flow elements allow for bulk and conditional creation of artifacts of the hierarchy.

G. Supported XML Directives

Table B shown in FIGS. 8 and 9 identifies elements that may feature in the <setup hierarchy> section. These directives include "create_template", "create_instance", "rename_object", "manage_object", "assign_object", "add_uda", "add_primitive", "attribute", and "control flow".

The create instance directive lists name and template as required attributes. The attribute name identifies the name of the instance being created, and the attribute template, the template from which it is to be derived. An example is provided as follows:
    <create_instance name="UD_001" template="$UserDefined"/>

The manage object directive is useful, in that it handles the version control (e.g., check-out and check-in) for an object that is subjected to the set of non-trivial operations represented by directives that are specified as its descendants. An example is provided below.

```
<manage_object name="myUDO_001"> <!-- check out -->
  <assign to="myUDO_002"/>
  <add_uda uda_name="myUDA" type="int"/>
</manage_object> <!-- save and check in -->
```

The add uda directive may include one or more add_primitive directives as direct descendants. The term uda or UDA refers to user defined attribute. The uda name attribute of the add uda directive is inherited by the descendent add_primitive directives, unless expressly overridden. An example is provided as follows:

```
<manage_object name="myUDO_001"> <!-- check out -->
<assign to="myUDO_002"/>
<add_uda uda_name="myUDA" type="int">†
<add_primitive primitive_type="history"/>
<add_primitive primitive_type="analog">
<attribute attr_name="@{..\..\uda_name}.ROCAlarmed" value="true"/>
</add_primitive>
</add_uda>
</manage_object> <!-- save and check in -->
```

Note that each of the assign, add uda, add_primitive, and attribute directives performs its own object version management (check-out and -in) unless responsibility is delegated to an ancestral manage object directive.

Control-flow directives are common to both the setup and run sections, and include the following as set forth in the Table C shown in FIG. 10.

H. Action Types

A directive may be operated on in two directions: Apply, or Go; and Rollback, or Undo. There are, for example, two directives that exercise the Undo action: ublock and auto block. Each setup directive (create_instance, add_uda, add_primitive, deploy_hierarchy, etc.) that asserts (applies) change (action: Go), undoes it when rolled back (action: Undo). While the framework supports some directives with inverted connotations, such as delete_hierarchy, and undeploy_hierarchy, the set is by no means complete: Inversion of functionality may be achieved through the use of ublock and auto_block directives. The rationale for maintaining only a subset of inverted directives is that the framework assumes that setup is a creative process. That is, the user can start with nothing, and end with nothing.

It is noted that the execution methods of delete hierarchy and undeploy hierarchy merely invoke the execution methods of create hierarchy and deploy hierarchy, respectively, with an action of Undo. When a directive is undone, its child directives are undone first, in reverse order, before the directive is undone. A loop that is undone iterates backward, from count to 1.

I. The Run Directive

The <setup_hierarchy> directive simply defines a blueprint of the hierarchy. It is within the <run> directive that it is actually executed (via the <create-hierarchy> directive), which creates the hierarchy of objects in the galaxy. The run directive contains, as its second-tier, up to, but not exceeding, as many thread directives as stipulated in the num threads root element attribute. An example is provided below of how a run directive is defined:

```
<run mode="parallel" iterations="2" sync_points="1" [other... ]>
  <thread label="1">
  <!-- Thread 1 operations -->
  </thread>
  <thread label="2">
  <!-- Thread 2 operations -->
  </thread>
</run>
```

J. Attributes of the Run Directive

The run directive may have various attributes associated therewith. Examples of attributes for the run directive are provided in Table D as shown in FIG. 11. As shown in Table D, the attributes for a run directive can include mode, iterations, sync_points, gr_node, galaxy, uder_id, password and trace_file. All of these attributes (with the exception of sync_points) may be overridden via runtime options at the time of execution.

K. Supported XML Directives

The run directive can support additional directives. For example, the run directive supports, in addition to the directives supported by setup hierarchy, the following example directives described in Table E shown in FIGS. 12 and 13.

L. Sync Points

Figure 14:
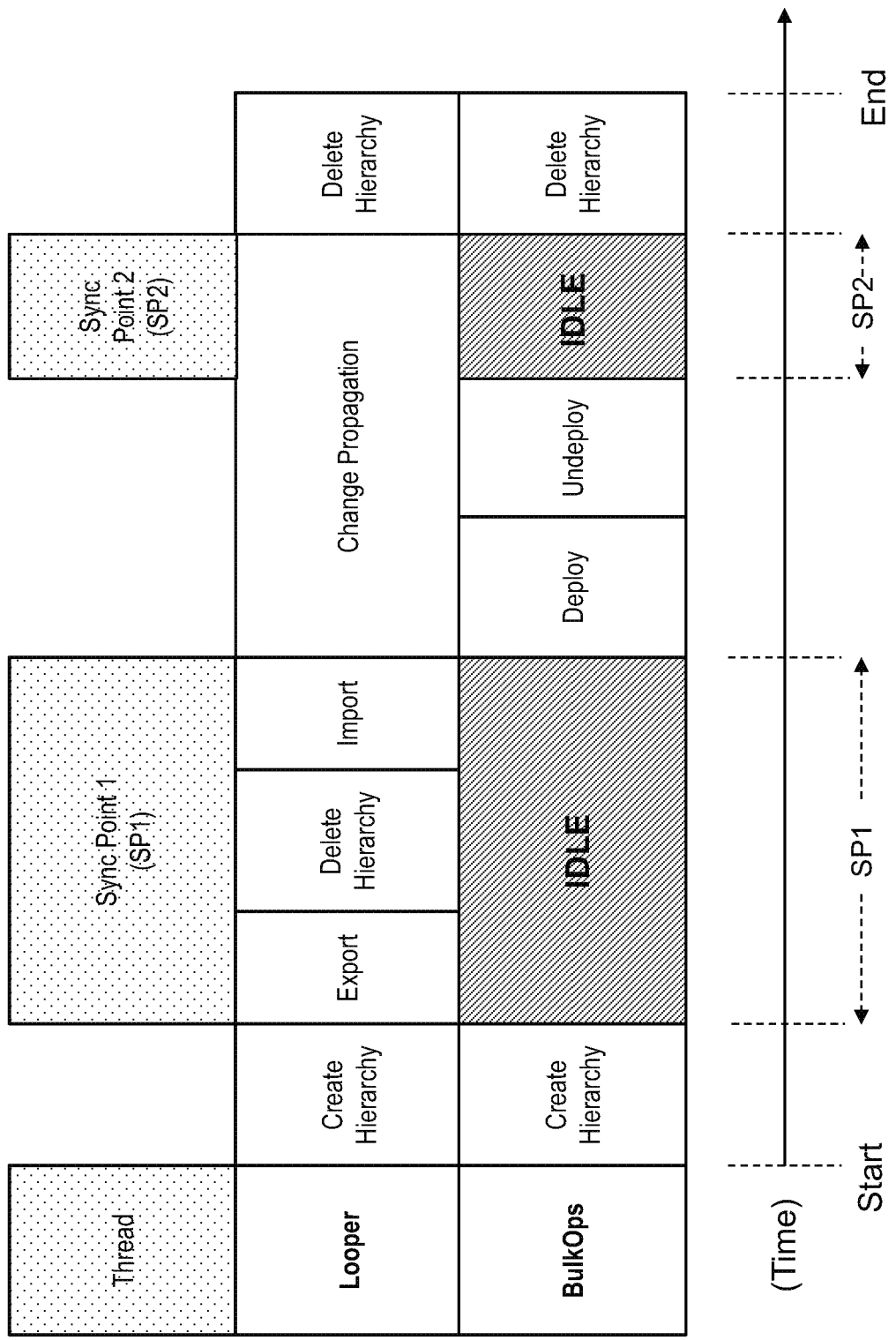
FIG. 14 is an example timing diagram showing a test run of a test scenario in which operations on two separate threads, generally noted as Looper and BulkOps, are synchronized at user defined synchronization point(s), in accordance with an example embodiment of the present disclosure.

Synchronization points (also referred to as "sync points") allow a user to coordinate the execution of two or more threads in such a way as to confine operations of interest to a fixed temporal frame. One or more synchronization points can be set in a flow of operations assigned to a thread using the sync directive, such as described in Table E in FIG. 12. As shown in FIG. 14, a timing diagram illustrates an example of the use of synchronization points to force the execution of the core of the test to a fixed starting point. In the example of FIG. 14, there are two threads, namely Looper and BulkOps. For the Looper thread, this means "change propagation", and for the BulkOps thread, "deployment and undeployment." Given that the time taken to setup or tear down the individual hierarchies may not be significant or of interest in this example, the use of two synchronization points allows a user to focus on performance metrics of operations between the trailing edges of sync point 1 (SP1) and sync point 2 (SP2).

As further shown in FIG. 14, the BulkOps thread sets up its hierarchy with the create hierarchy directive, and waits at sync point 1 for the Looper thread to catch up. The Looper thread sets up its hierarchy with the create hierarchy, export hierarchy, delete hierarchy, and import hierarchy directives, in that order, before catching up with the BulkOps thread at sync point 1. Once arrived, both threads proceed with the next action (or operation) in their charters. Thus, execution of operations on one of the separate threads is delayed or idled to synchronize execution at the synchronization point with operations of another of the separate threads.

Accordingly, while each thread sees a sync point as fixed point of temporal significance, in a running system in which two or more threads subscribe to a given sync point, each may reach it at a different point in time. A composite timeline of such a running system consequently depicts sync points as a band, framed between the points in time when the first and last of the threads that subscribe to it reach it. As shown in FIG. 14, a thread that reaches a sync point will suspend its activities until it is reanimated. The last of the threads subscribing to the sync-point to reach it wakes all suspended threads, which is how the system ensures that the instruction following the <sync>directive in each thread is executed at precisely the same time.

M. Events

The framework supports pre- and post-event handling for the following events:

Check-in
Checkout
Undo-checkout
Assign
Un-assign
Create-Instance
Rename-object
Delete-Instance Event handling measures are implemented in DLLs that are included via the <dll> directive of the script. An example is:

```
<dll MyEvents="GRAccessObjectLifecycleEvents.DLL" />
<create_instance     name=="Inst_#{curr}"     ...
Pre_checkin=="MyEvents.Events.PreCheckIn:@{name}">
```

Examples of events and their pre- and post-handler XML direction are provided in Table F shown in FIG. 15. It is not always obvious where to define certain handlers, e.g., where specify the pre_delete handler when the framework doesn't support a <delete_object> (instance or template) directive. Since for a <create_instance> directive the create events fire when the object is created, and the delete events fire when the directive is rolled back via a <ublock>, <auto_block>, or, implicitly, the <delete_hierarchy> directive, a user would specify the delete handlers in the <create_instance> directive directly.

<create instance name=="Inst_#{curr}"
pre_delete=="MyEvents.Events.PreDelete:@{name}">

Similarly, unassign event handlers must be specified in the <assign object> directive. Examining help text for individual directives with the -h command-line option explains the various events to which each directive could potentially be subjected.

Event handlers have static linkages, or are defined in a class with a default constructor. They have a return type of void. Event handlers can adhere to the following example signature:

void EvtHndlr(IGalaxy galaxy, StreamWriter trace, string[ ] args)

The following is a sample implementation of an event handler:

```
namespace MyNamespace // whatever
{
    public class Events // must be called out in the event-handler
    specification
    {
        public static void PreCheckin(IGalaxy g, StreamWriter trace,
        string[ ] args)
        {
        trace.WriteLine("<<<< In pre-checkin handler for {0} >>>>",
        arg[0]); if (args.Length > 2)
        if (args[0].ToLower( ).StartsWith("inst"))
        Thread.Sleep(Convert.ToInt32(args[1]));
        }
    }
}
```

The various terms used in the sample implementation are explained below.

IGalaxy galaxy: Reference to the prevailing IGalaxy COM interface in use by the invoking thread;

StreamWriter trace: Stream writer to which messages issued by the handler are directed;

string[ ] args: Arguments that are passed to the handler ("@{name}" in the example above).

By default, trace output from event handlers is redirected to the nul device (StreamWriter.Null). The runtime option—r event_trace:console will redirect trace output to the console. It writes to stdout if the—r chatty option is enabled, otherwise, to stderr.

Choosing—r event_trace:enable redirects output to the trace file associated with the invoking thread.

Writing to console takes precedence over writing to the trace file, if both options are specified. It should be noted that redirecting the stdout offers no safeguard against the interleaving of output from different concurrently running threads.

The framework uses Reflections to bind event-handling measures for individual directives, and is in a position to identify most varieties of configuration errors—missing methods, and mismatched numbers and types of arguments and/or return values—and thus preempt script execution to the accompaniment of a descriptive error message.

Enabling the runtime option -r events:disable_on_signature_mismatch reports the mismatch during setup, and silently disables the event handler without aborting script execution. Exceptions raised by a handler when invoked (runtime) are reported to the user as they occur, to stdout if the -r chatty command-line option is specified, otherwise, to stderr.

Specifying the -r events:disable_on_error command-line option will disable the errant handler from subsequent invocation for the stricken directive. Note that if the same spurious handler is specified for more than one directive, it has to fail at least once for each directive in order to be disabled for it.

Note that it may be necessary to rely on output redirection provided by the command shell to separate script output (when the -o option is not set) from trace messages, and exceptions thrown by event handlers.

```
cmd> utility.EXE --s script.XML --l C:\MyEventDLLs\lib
   2>.\MyTraceMessagesAndExceptions.txt
```

Event processing may be turned off entirely with the -r noevents command-line option.

N. Expressions

The use of expressions is central to making the framework flexible, and to allowing a single hierarchy blueprint to produce more than one distinct hierarchy. Expressions are used to identify attribute references, and as conditional and arithmetic expressions that are evaluated and substituted in place. For example, given the following create_instance directive,

```
<create_instance           name="UDO_001"
   template="$@{ROOT_TEMPLATE.name}"/>
``` if @{ROOT_TEMPLATE.name} evaluates to the string "myRootUDO" (i.e., there exists an ancestral node labeled ROOT_TEMPLATE that describes an attribute, name, that is initialized to "myRootUDO"), then the attribute name in the create_instance directive is changed to "$myRootUDO", stipulating that an instance named UDO_001 be created based on the template $myRootUDO.

Expressions are parsed into expression trees—and the attribute references they make are codified into memory references—during script initialization. Evaluation of expressions consequently adds negligible overhead to the actual execution of the script, contributing insignificantly to performance metrics reported by the framework.

O. Static Attribute References

All XML attributes defined by a directive are accessible by descendent directives. The referenced attribute are specified as "@{referenced attr}". An attribute reference may be direct or relative. All direct references are qualified with the label of the referenced element.

Given the directive:

```
<create_template label="ROOT TEMPLATE" name="myRootUDO"
template="$UserDefined">;
``` a descendent directive may refer to its name attribute with the following absolute reference:

```
<create_instance           name="UDO         001"
   template=$@{ROOT_TEMPLATE. name}/>
```

Attribute references may also be relative, like relative paths on the Windows file-system. A directive may reference its parent's attribute by qualifying it with "..\". An example is provided as follows:

```
<create_instance name="I1" template="@{..\name}"/>
```

As with relative paths on the Windows file-system, relative references may be of arbitrary lengths.

"@{..\..\..\..\attr_name}"

It should be noted that attributes referenced in this way must belong to ancestral nodes. Failure to properly indent script correctly could lead to confusion, and thus, it is important to indent child directives relative to their parent directives.

P. Built-in (also Called Local) Attribute References

The loop, thread, and the setup_hierarchy directives possess hidden, or built-in attributes that may be accessed from any of their descendants, depth notwithstanding. Built-in attribute references are qualified with the '#' symbol. As in "#{curr}".

Q. Built-ins supported by Loops

The following are examples of built-ins supported by loops.

Attribute Description

Curr The current counter of the loop (starting at 1, and ending at count)

Count The upper limit of the loop.

loop built-ins may be accessed from any of its descendants, no matter its depth. Resolving a loop built-in reference entails traversing up the lineage of the invoking directive until an ancestral loop is identified (done, as noted previously, during script setup, and not execution).

R. Local Variables

Consider the case where a user needs to create a hierarchy of $UserDefined derivatives that is 10 levels deep. This is an approximation of the logic that user can employ:

```
Let base := "$UserDefined";
Let name := "$UD" + Hierarchy.ID;
Let tname := "";
For (i:= 1; i <= 10; i++)
{
   Let tname:= name + "_" + i.ToString( );
   Create_template(name => tname, derived_from => base);
   Let base := tname;
}
```

In order for the loop directive to support such logic, it allows for the creation of local variables that may be dynamically altered in the course of its execution. A further approximation of the above logic is further provided as implemented with the loop directive:

```
<loop count=10>
<vars base="UserDefined" name="UD#{hierarchy.curr}" tname="" />
<pre tname="#{name}_#{curr} />
<post base="#{tname}" />
<create_template name="$#{name}_#{curr}" template="$#{base}" />
</loop>
```

As is evident, local loop variable references are also qualified with '#'.

S. Built-ins Supported by the Thread Directive

Both #{id} and #{curr}, when qualified with the label associated with the thread, will return the 1-based ID of the executing thread. (IDs and loop counters start at 1, not 0.)

T. Built-ins Supported by the Setup Hierarchy Directive

The built-in #{curr}, which is qualified with the label of the setup hierarchy directive, evaluates to the hierarchy ID (analogous to the thread ID).

U. Built-ins Supported by the Auto Block Directive

The built-in #{phase} evaluates to the phase of the nearest enclosing auto block directive to the point of invocation, and is either "apply" for Go, or "rollback" for Undo. The following example illustrates the use of the #{phase} auto block built-in:

```
<auto_block condition="true">
<block condition="?{#{phase} eq apply}>
<!-- Perform forward operation -->
</block>
<!—Operation(s) to be performed in both phases -->
</auto_block>
```

V. Global Attribute References

All attributes of the <defaults> directive are globally accessible throughout the script. A global attribute is referenced in the following manner: ^{global-attr}. The caret (^) symbolizes an arrow pointing upward, presumably to the <defaults> section. The following example snippet explains:

```
<defaults Template_Loop_Count="10">
...
<loop count="^{Template-Loop_Count}">
<create instance name-"Inst_#{curr}" template="$UserDefined"/>
</loop>
```

W. Unary Expressions

Unary expressions are expressions that feature a supported unary operator. Unary expressions have the following form:

"%{unary-expression}"

The framework offers two unary operators: The functor ("#"), and the negator ("!").

X. Functor Unary Expressions

The functor expects a fully qualified delineation of a method in a referenced DLL, with optional arguments. The functor-based unary expression invokes the referenced external method when evaluated. An example is provided as follows:

"%{#UtilityDLL.Strings. Concat:@{name}, #{curr}}"

It should be noted that, in this example, the functor methods must abide by the following rules:

They must have static linkage, or must belong to a class with a constructor that takes no arguments.

They must have a return type of bool or string, depending on whether they serve logical or literal purposes, respectively.

When the above unary expression is evaluated, the method Concat, belonging to class Strings, in the DLL referenced by the alias UtilityDLL in the <dll> section of the script, is invoked with the arguments that are supplied, namely "@{name}" and "#{curr}".

Y. Built-In Functors

The framework has a built-in class utility of string functions that may be accessed as functors. This is how a built-in functor implementation may be specified:

"%{#BuiltIn.StringUtil.<Method>:<arg>[,arg(s)]>]"

BuiltIn is a keyword, and a reference to the executing assembly, and should not be specified as an alias in the <dll> directive. The built-in functor methods can be restricted to the following:

string Join(string splicer, string arg1, string arg2, . . . )
   returns a concatenation of the passed arg(s), joined with splicer
string Replace(string arg, string oldpatt, string newpatt)
   returns arg after replacing every occurrence of oldpatt with newpatt
bool EndsWith(string arg, string patt)
   returns "true" if arg ends in patt; "false" otherwise
bool StartsWith(string arg, string patt)
   returns "true" if arg begins with patt; "false" otherwise
int Length(string arg, . . . )
   returns the "total length" of the passed arg(s)
int Count(string arg, string patt)
   returns the "total number" of occurrences of patt in arg An example is provided for implementing a functor based on a built-in:

name="%{#BuiltIn.StringUtil.Join:_, @{name}, #{curr}}"

The above-noted script invokes the BuiltIn.StringUtil.Join( )method to concatenate the values of @{name} and #{curr} with a splicing pattern of '_'.

An example is provided of using a Boolean functor, such as follows:
<block condition="%{#BuiltIn.StringUtil.StartsWith: @{name}, inst}">
The block condition is set to "true" if @name begins with "inst".

Z. Negator Unary Expressions

The negator unary operator negates the Boolean result of the [logical] expression associated with it. An example is provided as follows:

"%{!%{#UtilityDLL.Strings.IsOdd:#{curr}}}"

The negator above reverses the boolean return of the method IsOdd(#curr).

AA. Arithmetic Expressions

Arithmetic expressions are encased within the tokens "!{"and"}". Examples of Arithmetic expressions can, for example, include:

"!{7+9/3}", and
"!{#{count}/#{curr}}".

An exception is thrown if any of the operands is non-numeric. The resultant value replaces the expression, so,

"UD_!{7*2}", evaluates to

"UD_14".

BB. Logical Expressions

Logical expressions conform to the following syntax: ?{logical-expression}. They resolve to boolean values, or the literals "true" and "false". It should be noted that because the symbols '<' and '>' have special significance in XML, the comparative operators are lt, le, gt, ge, ne, and eq.

Examples of logical expressions are provided, as follows.
 "?{7 lt 8}" (evaluates to "true"),
 "?{!{4+3} gt 8}" (evaluates to "false"),
 "?{7 gt 8 or 9 lt 10}" (evaluates to "true"),
 "?{@{TEMPLATE.name}eq UD_1_1_2}", and so forth, If a user wishes to implement logic that executes directives every other time in a loop, the user can use an expression, such as follows.

```
<loop count="10">
  <block condition="?{!{#{curr} % 2} eq 0}">
    <!-- directives to execute every other iteration -->
  </block>
</loop>
```

When #{curr} is even, condition resolves to "true", which instructs the block directive to process its children. It should be noted that, in this example, the skip by clause of the loop directive could have achieved the same result.

CC. Ternary Expressions

The Ternary expressions are, for example, like the "?:" operator in C#. Structurally, they conform to the syntax:
 "+{<logical_expression>??<expr_if_true>|<expr_if_false>}".

An example is provided as follows:

```
<loop count="10">
<create_instance name="+{?{#{curr} % 2 eq 0}??foo|bar}_#{curr}" .../>
<!-- Creates instances "bar_1", "foo_2", "bar_3", "foo_4", etc. -->
</loop>
```

An error is flagged if the primary expression, logical expression, is not logical, or if the ternary expressions, expr_if_true and expr_if_false, are not of the same type. Ternary expressions are both scalar, arithmetic, or logical in construction.

DD. User-defined Expressions

Expressions can become quite convoluted in structure. The complexity only grows when they are repeated in several places in the script, or are embedded in other expressions. The <expressions> top-level directive allows for complex and reusable expressions to be defined, so that they may be accessed further below in the script.

Consider the following example expressions directive:
 <expressions Alt_names="+{?{#{curr}% 2 eq 0}??{0}|{1}}"/>

A user may access and execute, in a loop very like that described above, the registered expression to produce instances whose names alternate across iterations. The user needs to supply values for the placeholders {0} and {1} (very like with the String.Format( )method in C#).

```
<loop count="10">
<create_instance_name="*{Alt_names:foo,bar}_#{curr}" .../>
<!-- Creates instances "bar_1", "foo_2", "bar_3", "foo_4", etc. -->
</loop>
```

User-defined expressions may reference other user-defined expressions. Consider the following example declaration:

<expressions mod2="!{#{curr} % 2}" is_even="?{*{mod2} eq 0}" alt name="+{*{is_even}??{0}|{1}}"/>

The sample script, as described herein, shows some more examples of non-trivial user-defined expressions.

EE. Tracing Expressions

Expressions can become complex because they are implemented with greater weight ascribed to exactness of syntax than to promoting flexibility by loosening restrictions. To ensure that a user's expressions perform as intended, it is a constructive exercise to see how they are evaluated before they are pressed into service. To that end, when the user engages script in a "dry run" (e.g., using /d command-line option), the user can enable the runtime property expr:trace (—r expr:trace) to have the expression processor output detailed information on its workings to the console (stderr). An examination of this output will allow the user to validate the expressions. An example trace output is shown in FIG. 16. In the dry run mode, a test run is simulated without having the operations on the objects performed on a target system.

FF. More on the rloop directive

The loop directive is a useful, and often necessary, component of the setup hierarchy directive. The allowance for local variables, and pre- and post-processing adjuncts to this directive, while making it convenient to implement non-trivial functionality, can make replicating it in the run→thread directive error-prone and risky.

The rloop directive (under the run→thread directive), when it references a labeled loop directive under the setup hierarchy directive, gains access to all built-ins and local variables of the referenced loop directive, and each and every other attribute accessible to it in its lineage. Iterating through the rloop directive simulates an iteration of the referenced loop: All local variables, and pre- and post-processing thereof, are evaluated for each iteration of the referencing rloop directive.

Consider the following example script:

```
<GRAccessLoadTest num_threads="2">
<defaults CTL_Count="10"/>
<setup_hierarchy lab el="MyHier">
<loop label="CreateInstances" count="^{CTL_Count}">
    <vars tname="UD_#{MyHier.curr}" />
    <create_instance name="#{tname}_#{curr}" template="$UD"/>
</loop>
</setup_hierarchy>
<run>
<rloop ref="CreateInstances" skip_by="2">
    <assign_object name="# {tname}_#{ curr}" to="# {tname}_!{# curr}+1}"/>
</rloop>
</run>
</GRAccessLoadTest>
```

The complexity of duplication can be removed with the rloop reference. It is noted that the skip_by clause is overridden, but not count (which, incidentally, could also have been overridden, provided that the override did not exceed that of the referenced loop directive). The biggest advantage of the rloop construct is that it executes in the context of the loop directive it references, and, consequently, has access to all attributes in the referenced loop's lineage.

The rloop construct is quite nuanced. A single iteration of an rloop does not directly translate to an iteration of the loop it references. What ensues is that every control-flow element (i.e., loop and block directive) in the nesting lineage of the referenced loop is stepped through once from the top for every iteration of the rloop. For loop directives, this implies initializing loop counters (on first invocation), evaluating pre conditions, incrementing (or decrementing, based on the action—Go or Undo) loop counters, and evaluating post conditions, appropriately, without actually executing the child directives of the referenced loop(s). For block directives, this implies reevaluating permissibility constraints (the block.condition), which may have changed based on the outcome of the pre- and post-processing of ancestral loop directives.

The rloop directives may be nested themselves, provided that they do not make concentric references. A concentric reference is when a nested rloop refers to a loop that nests a loop directive referenced by an rloop directive that is an ancestor of the first rloop directive (the diagram below explains). In fact, since rloop directives may be executed in the reverse direction (i.e., rolled back), nesting rloop directives to mimic the hierarchy of the loop directives they reference is recommended. The sample script included in a subsequent section of this document demonstrates the use of nested rloop blocks.

Figure 17:
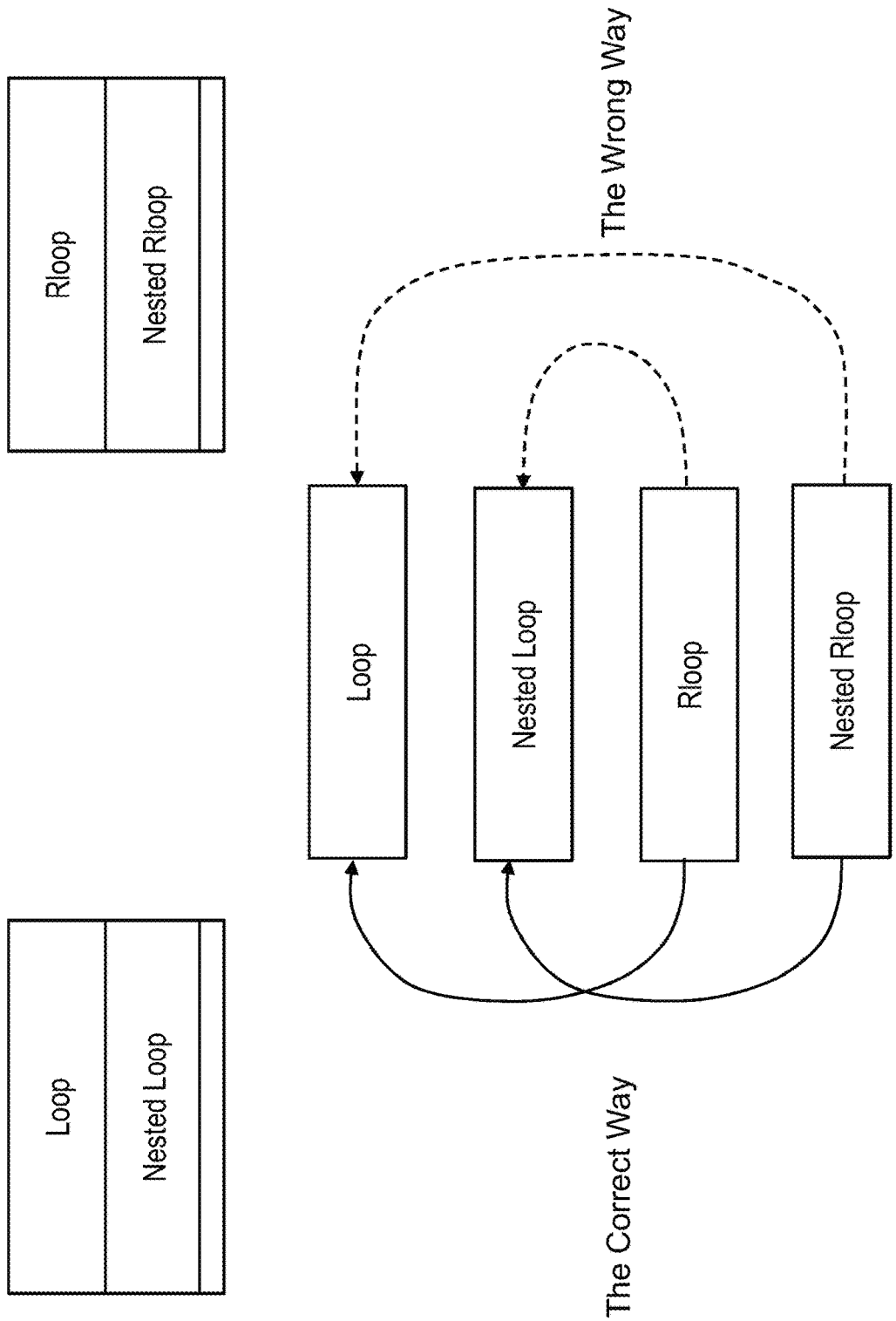
FIG. 17 is a diagram showing example correct and incorrect approaches to establishing references with a rloop directive in the script for a test scenario, in accordance with an example embodiment of the present disclosure.

The following diagram in FIG. 17 shows how, and how not, to establish rloop references. Accordingly, rloops offer more than a handy way to reuse loops.

GG. Sample Script Structure

An example script structure according to the disclosure is shown in FIGS. 18 and 19. Referring to FIG. 18, a root element defines num threads to 2, indicating that a total of up to two threads may be pressed into service by the execution engine. The attribute cwd is set to its default value of ".", suggesting that all file artifacts will be created relative to the directory from which the script is launched (not the location of the executable).

Sensible defaults are specified in a <defaults> section. Values declared in this section may be used as loop counters, sleep delays, and other artifacts used by execution directives in the script, and in embodiments are accessed using the following syntax: count="^{default_value}". An example advantage to confining such quantities in this section is that they can then be overridden at runtime, with command-line options, obviating having to edit the script to change constants.

An <expressions> section may be used to define complex and reusable expressions, for example. In embodiments, expressions declared in this section are dereferenced by conditionals and execution directives in the script using the following syntax: "*{expr_name[arg1 [,arg2 . . . ]]}".

A <dll> section may be used to declare all DLLs that implement functors and event handlers used by the script. Referencing a DLL declared in the <dll> section in the evaluation of a function may employ the following syntax:
    <block condition="%{Util.Algorithms.SoundexMatch: @{name}, key">,
where SoundexMatch is a method of the class Algorithms in the DLL referenced by Util in the <dll> section. The following is an example of accessing a method in a DLL to facilitate the post_create event handler:
    <create_instance_name="Inst_#{curr}"
      post_create="Events.PostEvents.Create:@{name}"1>

A <setup_hierarchy> directive may be used to describe the hierarchy that will be used by the threads of execution.

Finally, a <run> section may be used to describe the threads of execution. Attributes of this directive may, for example, define an overrideable model of execution. In some embodiments, unless overridden, the two threads of execution in the illustrated example will run in parallel, and can, for example, have up to three sync points to coordinate their operations. Thread trace information will be logged, for example, to a particular file relative to the prevailing cwd.

HH. The <setup hierarchy> Directive

An example hierarchy created by a <setup hierarchy> directive of the script structure described above may be:
    Platform_[hierarchy id]←Platform_[hierarchy_id]_Engine←
    Platform_[hierarchy_id]_Engine_Area. (←denotes a hosting relationship.)

Nested loops may create a hierarchy of user defined objects (UDO), $UserDefined←$UD[hierarchy_id]_1←$UD[hierarchy_id]2 . . . ←$UD[hierarchy_id]_10. In one embodiment, a predetermined number (e.g., 25) of derived instances may be created for each $UserDefined descendant (e.g., UD1_1_Inst[1..25]). Each instance is hosted by the area object Platform_[hierarchy_id]_Engine_Area.

Figure 20:
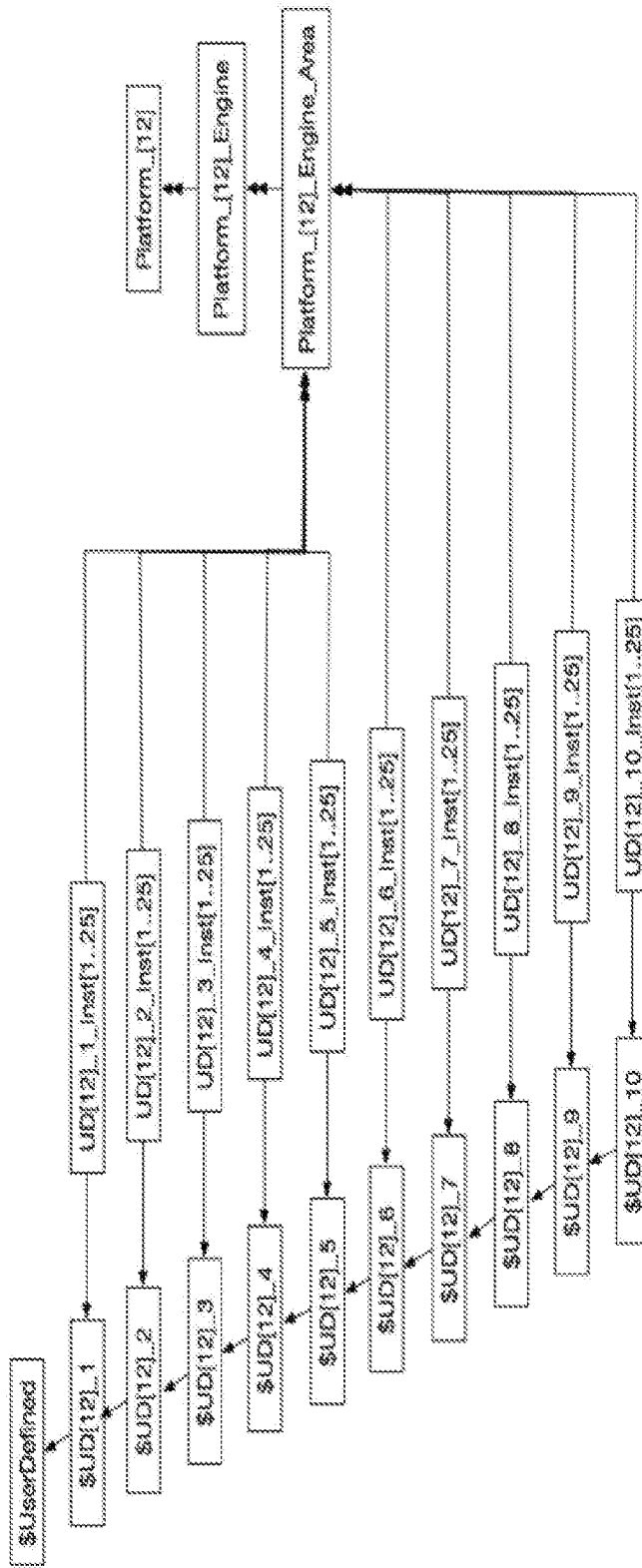
FIG. 20 is a diagram showing an example of two distinct hierarchies of objects, such as user defined objects (UDOs), with the root instances Platform_1 and Platform_2, in accordance with an example embodiment of the present disclosure.

The hierarchy_id may be replaced by the ID of a thread creating this hierarchy via a call to a create_hierarchy object, for example. If there are two threads (IDs 1 and 2), there may be two distinct hierarchies of objects, with the root instances being Platform_1 and Platform_2, as shown in FIG. 20.

II. Run::Thread #1—EXAMPLE

An example of first thread, e.g., Thread #1, may begin with a sleep period, for example, of about 2.5 seconds, to allow a second thread, e.g., Thread #2, to create its platform object first. The first thread may proceed to create its hierarchy, and awaits the other threads at a first sync point, e.g., sync point #1. Now begins the substance of the test.

In a loop that shadows a first control loop used to create a derived template hierarchy, the first thread may add a user defined attribute (UDA) to the prevailing UDO for the current iteration, enable a couple of extension primitives, and set and lock some dynamic attributes.

Next, in a loop that shadows a second control loop used to create instances for each derived template, the first thread may assign every even numbered instance to its odd-numbered predecessor, and adds a UDA and extend it for historization.

Next, the first thread may await the other threads at a second sync point, e.g., sync point #2, after which it undoes the instance assignments in two undo-blocks, and proceeds to a third sync point, e.g., sync point #3. After all threads coordinate their execution at sync point #3, the first thread deletes its hierarchy, and terminates.

JJ. Run::Thread#2—EXAMPLE

An example second thread may create its hierarchy, export it to a file called "export.\Hierarchy2.aaPKG" (relative to cwd), and delete its hierarchy. This may be achieved through the use of the auto_block directive. The second thread recreates its hierarchy in embodiments by importing its hierarchy from the export file that was previously created.

The second thread may synchronize its execution with the first thread by awaiting it at sync point #1, thus entering into the substance of the test. The second thread may proceed to deploy its hierarchy and awaits the first thread at sync point #2, after which it undeploys each instance individually from within a ublock. Finally, the second thread awaits the first thread at sync point #3, and concludes by deleting its hierarchy.

KK. Script Execution

Figure 21:
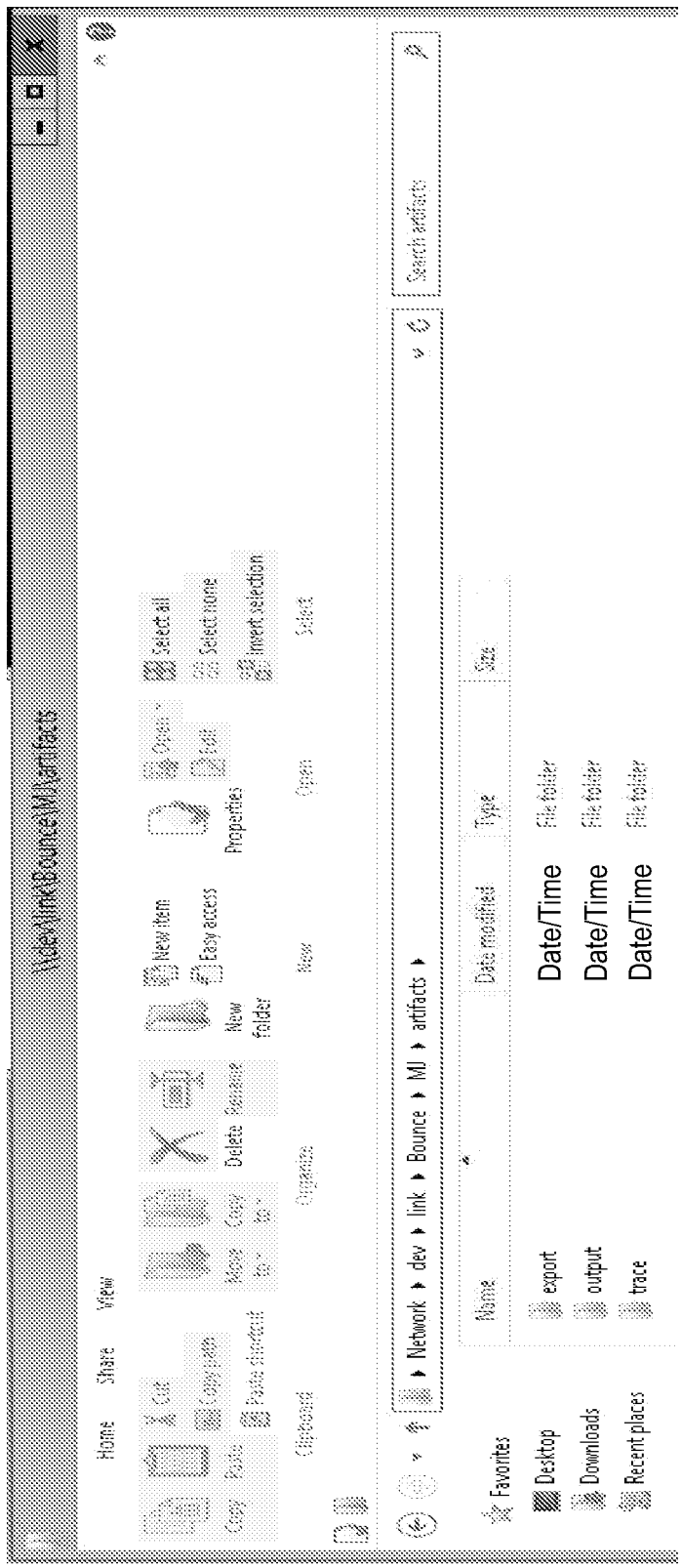
FIG. 21 is a portion of window-based user interface showing example directories including a trace directory and other directories in which trace files or other files for a test run can be stored, in accordance with an example embodiment of the present disclosure.

Output artifacts described below were produced by executing the script as follows: C:\Users\wwuser\Desktop\GRATF\GRAccessTestFramework\GRAccessTestFramework.\bin \De bug> GRAccessTestFramework.exe /s GRAccessTest.xml -g BAS -o output\OUTPUT001.xml-v ct1_count=1 —v ci1_count=
5 -w \\dev\link\bounce\MJ\airfacts The number of iterations of the CTL and ClnstL loops were overridden with the use of the —v command-line switch. Because cwd was overridden (with -w), all output artifacts were produced relative to "\\dev\link\bounce\MJ\airfacts", such as for example shown in FIG. 21.

Because the <run> directive was configured as shown in FIGS. 22-24, trace files were created under a directory called trace:

<run iterations="1" mode="parallel" sync_points="3"
    trace file="trace\thread.log">

Figure 26:
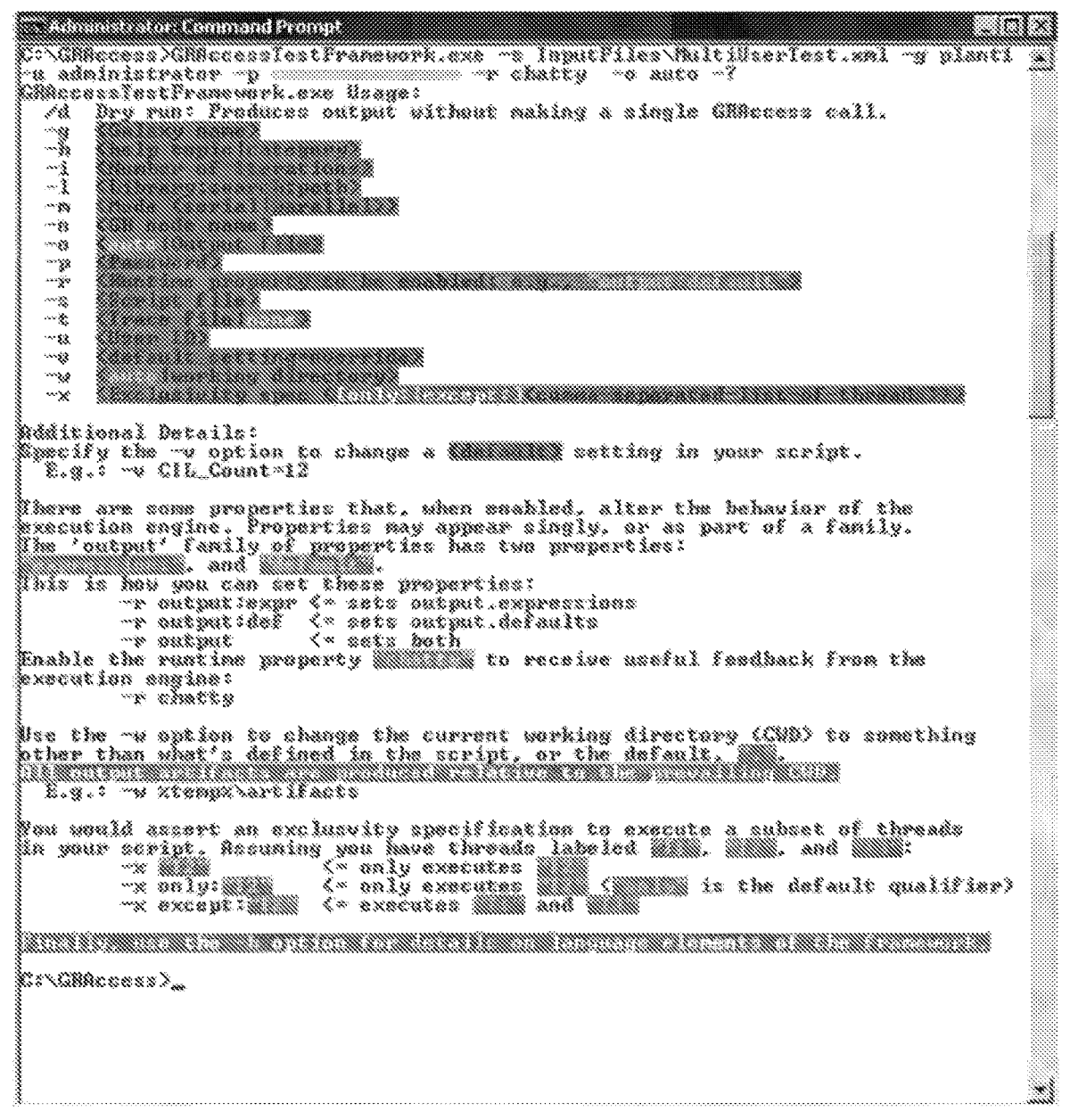

The executing script usually writes nothing to the console. When invoked with a command-line option which is configured to print or otherwise output to the console milestones in the execution of the script, for example, however, the script writes useful information in the wake of its execution, such as shown in FIG. 25. Additionally, executing the script with an application usage command-line option or switch may display usage information similar to what is shown in the graphic below in FIG. 26.

LL. Command-Line Options and Switches

In embodiments, the GRAccess Test Framework may be invoked with the following command-line switches, such as described in the Table G as shown in FIGS. 27 and 28.

MM. Syntax Errors

When the script is executed, there may be syntax errors which may be reported. Examples of syntax errors in the script, which are reported, can include the following.

Initialization error:
Error resolving user-defined expression

```
==> "alt_name" => "+{*{is_even}??foo|bar}"
==> "is_even" => "?{*{mod} eq 0}"
```

Invalid user-defined expression: "mod"
Error processing node:

```
<create_instance> <- <loop>
<loop> <- <CREATENEWINSTANCES.block>
<block> <- <ANOTHERLOOPER.thread>
```

Unrecognized tokens are pinpointed:
Initialization error:
Error resolving user-defined expression
==>"funky_conditional"=>"?{*:{is_even:
    #{curr}}AND#{curr}lt 5 OR#{curr}ge 7}"
Error in expression (around char 4):

```
----v
"?{*:{is_even:#{curr}} AND #{curr} lt 5 OR #{curr} ge 7}":
----^
```

'{'preceded by unrecognized token ':'.
Error processing node:

```
<loop> <- <CREATE_NEW_INSTANCES.block>
<block> <- <LOOPER.thread>
```

NN. Performance Metrics

Figure 29:
FIG. 29 illustrates output of performance metric data for a test run of a test scenario when the script is executed, in accordance with an example embodiment of the present disclosure.
Figure 29:
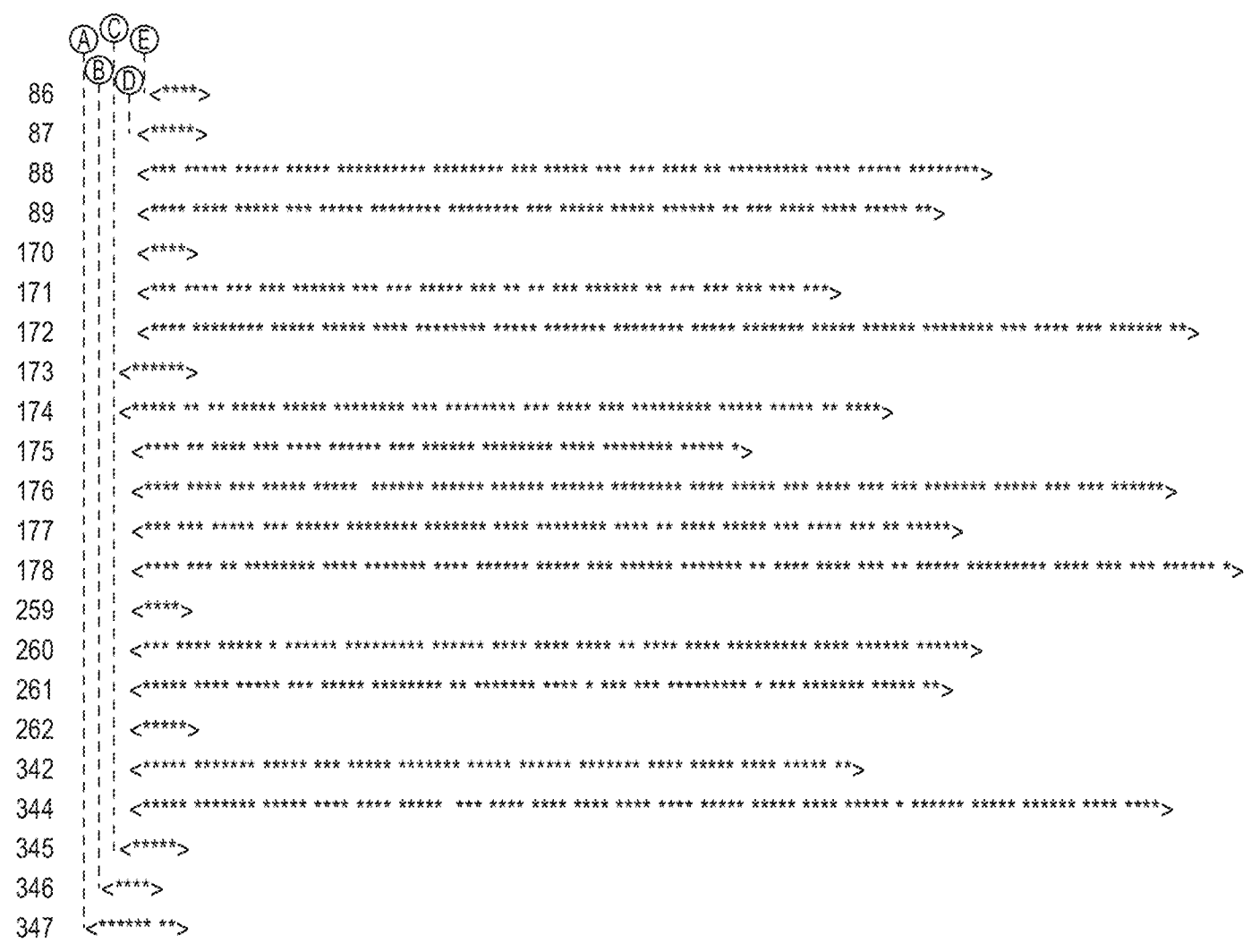

Executing the script can produce output in the form of performance numbers in a bottom-up presentation, indicating when each directive, and each of its descendants, was launched, the time that each took to run through to completion, with this duration aggregated upward. An example of output of performance metric data is shown in FIG. 29.

In this example, much of the lengthier output (the rloop and the create hierarchy directives, for instance) has been collapsed, revealing only cumulative times.

The launch times of the threads are offset from when the launch time of the script by the time it takes for the system to initialize (connect to galaxy)—a little over 12 seconds in this run, as indicated by the initialization time attribute of the root node. Non-zero execution times of sync points indicate the time spent by a thread awaiting the other to reach the sync point. Note that the threads are launched at the same time as the prevailing mode is parallel.

OO. Trace Files

Every command executed—and every milestone recorded—by a thread is logged in its trace file. The start of a command/directive is marked with '>'. The directive is qualified with its label, if assigned one. A command is indented by as many vertical bars (r) as its depth in the XML, hierarchy. The action being performed (Go or Undo), and the time of invocation are also printed.

The end of a command/directive is marked with "<". Its indentation matches that of its corresponding start directive. The status and duration (e.g., in milliseconds (ms) or other increment of time as desired) is also printed. Identifying the end of a directive is simply a matter of following the "|" symbol down the output from its starting point.

Milestone information appears between the start and end directives, and are preceded with the '+' symbol. The time taken, in milliseconds, to register a milestone (e.g., checkout object) is recorded beside it. Milestones record a subject, predicate, and object (e.g., "UD_001", "assign to", and "UD_002", respectively). The subject is optional, resulting in the recording of such milestones as "checkout UD_003". An example of a trace of the test run for two parallel executed threads, such as a first thread and a second thread, is shown respectively in FIGS. 30 and 31. FIG. 30 illustrates the information in the trace file of the first thread, e.g., Thread #1 which is labeled as "Looper". FIG. 31 illustrates the information in the trace file of the second thread, e.g., Thread #2 which is labeled as "BulkOps".

PP. Best Practices and Additional Examples

When designing and creating a test scenario for the framework, there are a few approaches or issues that may be considered.

1. Predicative Setup

While setting up a hierarchy, it may be desirable to follow a nesting scheme that mirrors the hosting hierarchy. In other words, if a platform "p", an engine "e" that is hosted by "p", and an area "a" that is hosted by engine "e" are being created, the directives can be organized such that the create instance for the engine is a child of the create instance for the platform; and the create instance for the area is a child of the create instance for the engine. The success of [un]deployment may hinge on such a scheme. All instances that are hosted by "a" may appear as peer directives.

2. Use Defaults

Consign all sleep intervals and loop counts to the <defaults> section, as it is easy to override them with the -w runtime switch (without having to open, edit, and save the script).

3. Organize Output Artifacts

Assign a directory for the execution a script, and have the execution engine produce all artifacts relative to it. For instance, if a user is executing a script called "Boolean.XML", assert a CWD of Boolean (either via the cwd attribute of the root node, or via the command-line option -w). In the <run> node, specify trace_file="trace\thread.log" (or specify it with the -t command-line option), so that all trace files are created under the directory ""\Boolean\trace\". Invoke the script with—o "output\Boolean.XML" so that the output is written to a file called ".\Boolean\output\/Boolean.XML".

4. Make Expressions Reusable

Consign all reusable and non-trivial expressions to the <expressions> section. Build complex expressions from simpler expressions.

5. Test Script First

Run the script in dry run mode (with the /d command-line switch). The output file created for the dry run can be examined and checked for any issues or problems before executing the test scenario on the target system. For example, enable expression tracing with the -r expr:trace command-line switch, and examine the expression-processing information output to stderr to confirm that the expressions are performing as intended.

6. Enable Chattiness.

Run the script with the—r chatty command-line option to have it write milestone information to the console.

7. Maintain Reusable DLLs

Avoid cramming everything into one DLL. Separate out event-processing and functor logic. Preserve the DLLs in a well-known location. The path-like specification of the—I command-line option means that the user can test out DLLs before pressing them into service. An event-processing DLL may be in the directory CATesting while it is being tested, and may be moved to CAProduction after its charter is confirmed. Invoke the script with—I "C:;C:", and the script will be able to successfully locate it.

8. Examine Trace Output to Troubleshoot Problems

The trace files contain important information, and are an invaluable aid in understanding unexpected behaviors.

9. Look up Command Help

The -h command-line option lists detailed help about language elements. When output is not redirected to a file (or to a process via a pipe), keywords are highlighted so as to stand out.

10. Use Sync Points

Use sync points even if the user's script defines only one thread directive. When run with the—r chatty option, milestone information is output to the console when execution reaches registered sync points.

11. End on a Sync Point

If the user's script describes more than one (1) thread, then let each thread end with a sync directive. It is not necessary for all threads to subscribe to the same sync points, but the final sync point to which each thread subscribes has to have the same ID. A three (3) thread example with five (5) sync points are shown in FIG. 32. As shown in FIG. 32, all three threads end with the same sync point, e.g., sync id="5". In this example, all of the sync points are not shared or implemented for each of the three threads. For example, the thread having id="1" shares a sync point, e.g., sync id="4", with the thread having id="3", but not with the thread having an id="2". However, it should be understood that, if desired, the user can configure all of the threads to have the same or different combination of sync points.

12. Example Utility—GRATify

The output of the GRAccess Test Framework (GRAccessTestFramework.EXE) is a thread-by-thread breakdown of performance metrics, grouped by iteration. GRATify.EXE is a utility that reorders this output, presenting it in a sync-point-centric manner. The utility takes up to two language stipulations:

GRATify.EXE [output-of-GRAccessTestFramework.EXE][reordered-output-file].

Output is routed to stdout if the second argument is not specified. Input is read from stdin if the first argument is unspecified.

A sample invocation using standard file handles is provided as follows:

Cmd> GRAccessTestFramework.EXE -s script.XML -m parallel -g BAS|GRATify.EXE>output.XML GRATify.EXE can work with the output of GRAccessTestFramework.EXE (or the like) when the latter is executed in mode: parallel. This is because sync-points are superfluous when a script is executed in serial mode. An example of output from the invocation of the utility is shown in FIG. 33, which reorients the data of FIG. 29 by sync point.

13. Example Execution Sequence

Figure 34:
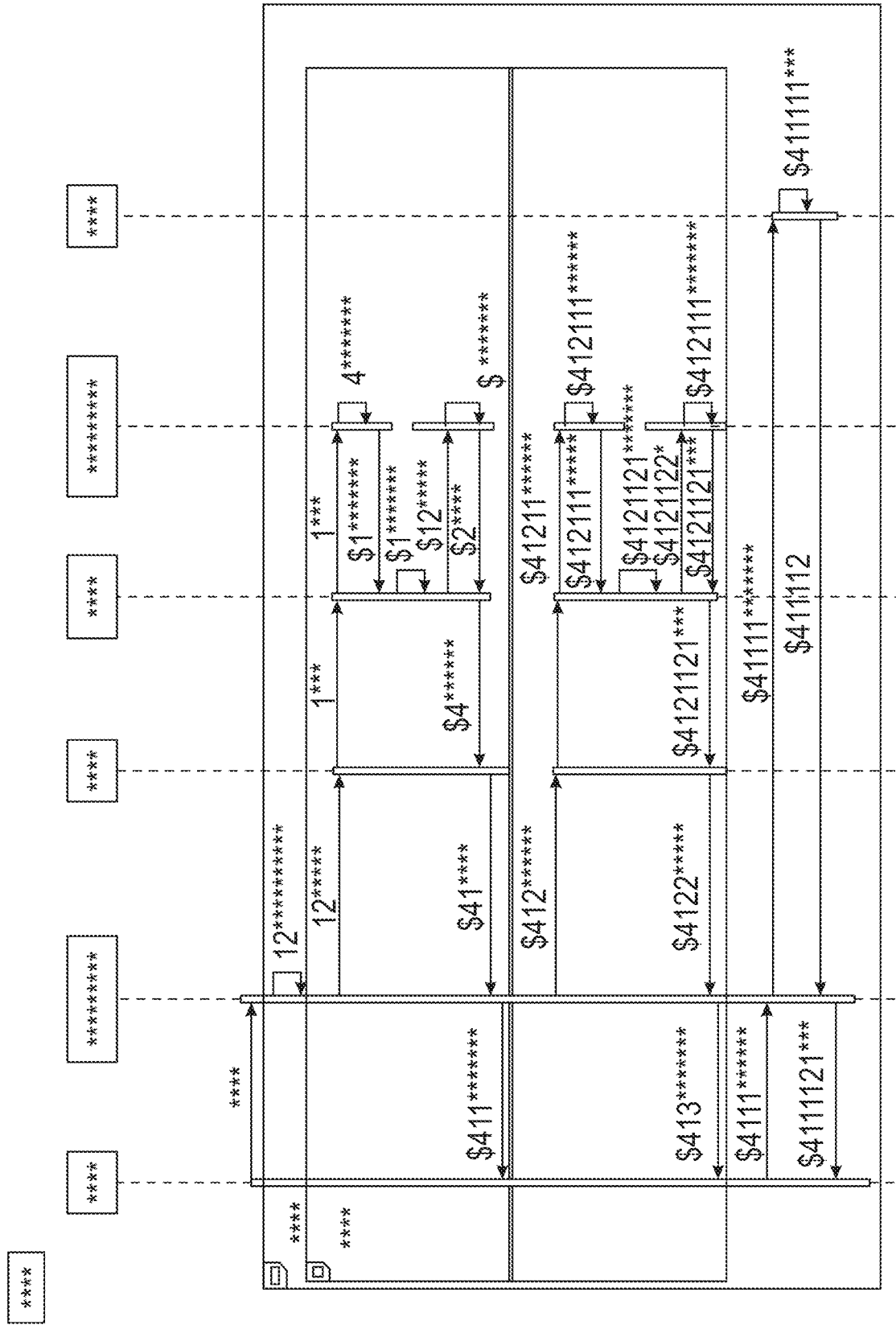
FIG. 34 illustrates an example execution sequence for a test run of an example test scenario.

FIG. 34 illustrates an example execution sequence for a test run of an example test scenario, including the interactions between various software components such as MainThread, CmdExecutor.RunCommand, RunCommand, ThreadCommand, and CmdExecutor.ThreadCommand. The execution sequence includes: 1: Execute, 1.1: ConnectToGalaxy (if not dry run), 1.2: ExecIteration( ), 3: Execute ( ) 2: Execute( ) 4: StartTimingCommand( ) 5: ExecCommand( ) 5.1: ProcessCommandAndChildren( ) 5.2: return: status, 5.3: return: status, 6: StopTimingCommand ( ) 5.4: return: status, 5.4.1: return: status, 5.4.1.1: return: status. The execution sequence also includes: 5.4.1.2: ExecIteration°, 5.4..1.2: MtExecute( ) 5.4.1.2.1.1: Execute ( ) 5.4.1.2.1.1.1: StartTimingCommand( ) 5.4.1.2.1.1.2: ExecCommand( ) 5.4.1.2.1.1.2.1: ProcessCommandAndChildren( ) 5.4.1.2.1.1.2.2: return: status, 5.4.1.2.1.1.2.3: return: status, 5.4.1.2.1.1.3: StopTimingCommand( ) 5.4.1.2.1.1.2.3: return: status, 5.4.1.2.2: return: status, and 5.4.1.3: return: status. The execution sequence also includes: 5.4.1.3.1: GetResults(streamWriter), 5.4.1.3.1: Generated(cmd: CmdExecutor), 5.4.1.3.1.1.1: GenerateResultsFromDurationStack(cmd), 5.4.1.3.1.1.2: , and 5.4.1.3.1.1.2.1: return: success.

It should be understood that devices, systems and methods described above are provided as examples. The various devices or systems, such as in FIG. 1, can include processor(s), memory, communication devices and other components to provide or control services and operations provided in the computing architecture 10.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions of the script syntax for the various sections of a script file or script for a test scenario, directives, command-line switches, expressions, objects, attributes, thread names, file names, directory names and other naming conventions used herein are provided as examples, and can be given a different name or label.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices can include, but are not limited to, disks, solid state drives, optical disks, removable memory devices such as smart cards, SIMS, WIMs, semiconductor memories such as RAM, ROM, PROMS, etc. Transmitting mediums include, but are not limited to, transmissions via wireless communication networks (e.g., Radio Frequency (RF) communication, the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A method comprising:
    providing a script-driven framework to a target process management system to monitor performance of industrial operations on two or more sets of objects within the target process management system, each of the two or more sets of objects being an application object that has an operation performed thereon; and
    executing, within the script-driven framework, a script file comprising a test scenario with user-defined language stipulations, the user-defined language stipulations including a flow-control construct and corresponding operation hierarchy for the industrial operations to execute each of the two or more sets of objects in sequence with each other within the script-driven framework, the execution of the script file comprising:
        creating the two or more sets of objects according to said test scenario;
        monitoring performance of the industrial operations on the two or more sets of objects according to said test scenario, said monitoring comprising executing the industrial operations on each of the two or more sets of the objects in sequence with each other according to the operation hierarchy of the test scenario as defined by user-defined language stipulations, the sequential operation of the two or more sets of objects are based on each of the objects being at a same level of the hierarchy within the test scenario which enables identification of degraded performance at a macro or micro level;
        collecting and storing performance metric data in memory, the performance metric data corresponding to the industrial operations of the objects for each of the two or more sets of objects according to an order of execution and termination of an object to maintain the performance metric data in relations to the operation hierarchy of each of the two more sets of objects;
        deleting the two or more sets of objects upon completion of the sequential industrial operations; and
        terminating execution of industrial operations.

2. The method of claim 1, wherein the two or more sets of objects are nested objects that have a parent-child relationship.

3. The method of claim 2, wherein industrial operations related to an object within the set of objects are based on successful execution of its parent object.

4. The method of claim 3, wherein the industrial operations of an object result in a stop, skip or continue result, wherein sequential operation of a subsequent object is possible for a skip and continue result for a parent object.

5. The method of claim 1, wherein the two or more sets of objects are executed on separate threads within the script-driven framework, where the separate threads correspond to different industrial operations.

6. The method of claim 5, wherein the user-defined language stipulations further comprise at least one synchronization point corresponding to a point in time at which the industrial operations on the separate threads are to be synchronized.

7. The method of claim 1, wherein the performance metric data comprises at least data corresponding to an execution time for the industrial operations on each object from the two or more sets of objects.

8. The method of claim 1, wherein the collecting and storing comprises:
    querying a register to obtain values corresponding to performance metric data for the industrial operations on each set of objects executing on a respective one of the separate threads, and
    storing the obtained values corresponding to the performance metric data on a separate stack for each one of the separate threads.

9. The method of claim 1, further comprising:
    reading out the stored performance metric data for the industrial operations on each object in each set of objects in relations to the order of execution and termination; and
    outputting information relating to the performance metric data for the two or more sets of objects.

10. The method of claim 1, further comprising:
    receiving script inputted by a user through a user interface to define the language stipulations for the test scenario for the target process management system; and
    storing the script in a script file which is used by the framework as a structural blueprint to control the creating, executing, collecting and storing, terminating and deleting industrial operations during a test run of the test scenario.

11. A non-transitory computer-readable storage medium tangibly encoded with computer-executable instructions, that when executed by a device, performs a method comprising:
    providing a script-driven framework to a target process management system to monitor performance of industrial operations on two or more sets of objects within the target process management system, each of the two or more sets of objects being an application object that has an operation performed thereon; and executing, within the script-driven framework, a script file comprising a test scenario with user-defined language stipulations, the user-defined language stipulations including a flow-control construct and corresponding operation hierarchy for the industrial operations to execute each of the two or more sets of objects in sequence with each other within the script-driven framework, the execution of the script file comprising:

creating the two or more sets of objects according to said test scenario;

monitoring performance of the industrial operations on the two or more sets of objects according to said test scenario, said monitoring comprising executing the industrial operations on each of the two or more sets of the objects in sequence with each other according to the operation hierarchy of the test scenario as defined by user-defined language stipulations, the sequential operation of the two or more sets of objects are based on each of the objects being at a same level of the hierarchy within the test scenario which enables identification of degraded performance at a macro or micro level;

collecting and storing performance metric data in memory, the performance metric data corresponding to the industrial operations of the objects for each of the two or more sets of objects according to an order of execution and termination of an object to maintain the performance metric data in relations to the operation hierarchy of each of the two more sets of objects;

deleting the two or more sets of objects upon completion of the sequential industrial operations; and terminating execution of industrial operations.

12. The non-transitory computer-readable storage medium of claim 11, wherein the two or more sets of objects are nested objects that have a parent-child relationship.

13. The non-transitory computer-readable storage medium of claim 12, wherein industrial operations related to an object within the set of objects are based on successful execution of its parent object, wherein the industrial operations of an object result in a stop, skip or continue result, wherein sequential operation of a subsequent object is possible for a skip and continue result for a parent object.

14. The non-transitory computer-readable storage medium of claim 11, wherein the two or more sets of objects are executed on separate threads within the script-driven framework, where the separate threads correspond to different industrial operations, wherein the user-defined language stipulations further comprise at least one synchronization point corresponding to a point in time at which the industrial operations on the separate threads are to be synchronized.

15. A device comprising:
a processor and
a non-transitory computer-readable storage medium tangibly encoded with computer-executable instructions, that when executed cause the processor to:

provide a script-driven framework to a target process management system to monitor performance of industrial operations on two or more sets of objects within the target process management system, each of the two or more sets of objects being an application object that has an operation performed thereon; and execute, within the script-driven framework, a script file comprising a test scenario with user-defined language stipulations, the user-defined language stipulations including a flow-control construct and corresponding operation hierarchy for the industrial operations to execute each of the two or more sets of objects in sequence with each other within the script-driven framework, the execution of the script file comprising:

create the two or more sets of objects according to said test scenario;

monitor performance of the industrial operations on the two or more sets of objects according to said test scenario, said monitoring comprising executing the industrial operations on each of the two or more sets of the objects in sequence with each other according to the operation hierarchy of the test scenario as defined by user-defined language stipulations, the sequential operation of the two or more sets of objects are based on each of the objects being at a same level of the hierarchy within the test scenario which enables identification of degraded performance at a macro or micro level;

collect and store performance metric data in memory, the performance metric data corresponding to the industrial operations of the objects for each of the two or more sets of objects according to an order of execution and termination of an object to maintain the performance metric data in relations to the operation hierarchy of each of the two more sets of objects;

delete the two or more sets of objects upon completion of the sequential industrial operations; and terminate execution of industrial operations.

16. The device of claim 15, wherein the two or more sets of objects are nested objects that have a parent-child relationship, wherein industrial operations related to an object within the set of objects are based on successful execution of its parent object, wherein the industrial operations of an object result in a stop, skip or continue result, wherein sequential operation of a subsequent object is possible for a skip and continue result for a parent object.

17. The device of claim 15, wherein the two or more sets of objects are executed on separate threads within the script-driven framework, where the separate threads correspond to different industrial operations, wherein the user-defined language stipulations further comprise at least one synchronization point corresponding to a point in time at which the industrial operations on the separate threads are to be synchronized.

* * * * *